United States Patent
Cyr et al.

(10) Patent No.: US 12,172,727 B2
(45) Date of Patent: Dec. 24, 2024

(54) ATTACHMENT SYSTEM FOR ATTACHING A STORAGE CONTAINER TO A VEHICLE

(71) Applicant: BOMBARDIER RECREATIONAL PRODUCTS INC., Valcourt (CA)

(72) Inventors: Bruno Cyr, Shefford (CA); Pierre Lacasse-Jobin, Magog (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 381 days.

(21) Appl. No.: 17/629,201

(22) PCT Filed: Jul. 20, 2020

(86) PCT No.: PCT/IB2020/056805
§ 371 (c)(1),
(2) Date: Jan. 21, 2022

(87) PCT Pub. No.: WO2021/014336
PCT Pub. Date: Jan. 28, 2021

(65) Prior Publication Data
US 2022/0234670 A1   Jul. 28, 2022

Related U.S. Application Data

(60) Provisional application No. 62/877,170, filed on Jul. 22, 2019.

(51) Int. Cl.
*B62J 9/27* (2020.01)
*B62J 9/23* (2020.01)
*B62J 9/30* (2020.01)

(52) U.S. Cl.
CPC . *B62J 9/27* (2020.02); *B62J 9/23* (2020.02); *B62J 9/30* (2020.02)

(58) Field of Classification Search
CPC .............. B62J 9/27; B62J 9/00; B62J 9/20
See application file for complete search history.

(56) References Cited

U.S. PATENT DOCUMENTS 7,377,570 B2      5/2008   Rondeau et al.
7,854,460 B2 *   12/2010   Tweet ................ B62J 7/00
                                                        180/908

(Continued)

FOREIGN PATENT DOCUMENTS

CN           1496896 A      5/2004
CN         102971194 A      3/2013

(Continued)

OTHER PUBLICATIONS

The Supplementary European Search Report accompanied by the European Search Opinion issued during the prosecution of corresponding application No. 20845006.4 on Jan. 25, 2024.

(Continued)

*Primary Examiner* — Brian D Nash
(74) *Attorney, Agent, or Firm* — BCF LLP

(57) ABSTRACT

An attachment system for attaching a storage container to a vehicle includes a passive attachment device for securing the storage container to the vehicle. The passive attachment device automatically secures the storage container to the vehicle when the storage container is positioned in place on the vehicle. The attachment system also includes an active attachment device manually operable by a user to selectively lock the storage container in place on the vehicle when the storage container is secured to the vehicle via the passive attachment device. The active attachment device prevents motion of the storage container relative to the vehicle when the active attachment device is engaged so as to lock the storage container in place on the vehicle. A vehicle including the storage container and the attachment system is also (Continued)

provided. A storage container assembly including the storage container and passive and active attachment devices is also provided.

20 Claims, 20 Drawing Sheets

(56) References Cited

U.S. PATENT DOCUMENTS

| | | | |
|---|---|---|---|
| 8,646,668 B2* | 2/2014 | Oakes | B60R 9/065 |
| | | | 224/539 |
| 8,925,965 B2* | 1/2015 | Pecora | B62J 7/04 |
| | | | 280/769 |
| 9,168,875 B2* | 10/2015 | Haler | B60R 9/06 |
| 9,919,657 B2* | 3/2018 | Benedict | B60R 9/06 |
| 10,065,698 B1* | 9/2018 | Sliwa | A45C 13/385 |
| 10,829,174 B2* | 11/2020 | Baruzzo | B62J 1/14 |
| 11,572,121 B2* | 2/2023 | Marchildon | B62J 9/24 |
| 2011/0049205 A1* | 3/2011 | Laperle | B62J 9/27 |
| | | | 224/419 |
| 2013/0094920 A1* | 4/2013 | Massicotte | B60P 7/0807 |
| | | | 410/82 |
| 2013/0133964 A1* | 5/2013 | Massicotte | B60P 7/0807 |
| | | | 224/547 |
| 2015/0053733 A1 | 2/2015 | Massicotte et al. | |
| 2015/0210355 A1* | 7/2015 | Labbe | B62M 27/02 |
| | | | 224/408 |
| 2017/0174145 A1 | 6/2017 | Labbe | |
| 2017/0247074 A1 | 8/2017 | Dery et al. | |
| 2017/0327185 A1 | 11/2017 | Labbe et al. | |
| 2020/0001861 A1* | 1/2020 | Laberge | B60W 50/00 |
| 2020/0406730 A1* | 12/2020 | Fournier | B60P 7/0815 |
| 2022/0234670 A1* | 7/2022 | Cyr | B62J 9/30 |

FOREIGN PATENT DOCUMENTS

| | | |
|---|---|---|
| CN | 105813896 A | 7/2016 |
| CN | 106660597 A | 5/2017 |
| CN | 107107981 A | 8/2017 |
| CN | 108025679 A | 5/2018 |
| CN | 110072406 A | 7/2019 |
| DE | 4041460 A1 | 6/1992 |
| DE | 202009004989 U1 | 12/2009 |
| DE | 202015104085 U1 | 10/2015 |
| DE | 102022101891 A1 | 7/2023 |
| EP | 1652761 A2 | 5/2006 |
| EP | 3741655 B1 | 7/2023 |
| TW | 200909285 A | 3/2009 |

OTHER PUBLICATIONS

International Search Report of International Application No. PCT/IB2020/56805, Search Completed on Oct. 9, 2020, Authorized Officer Lee Young, 2 pages.

Gulf Coast Motorcycles, BMW K1600GTL Top Case Removal Instructions, https://youtu.be/Dg5Lhk023_c, Retrieved on May 29, 2013.

A copy of the Search Report issued during the prosecution of corresponding application No. 2020800644036 on May 11, 2024.

蒲金鹏;段俊强;,纯电动客车快换电池箱体锁紧系统设计，轻型汽车技术, 第 10 期, Oct. 15, 2013 (translation not provided).

温金华;,滑动式汽车行李架承载结构设计, 汽车与驾驶维修(维修版), 第 05 期, May 3, 2017 accompanied by English machine translation : "Design of Sliding Automobile Luggage Rack Carrying Structure" by Wen Jinhua.

* cited by examiner

ATTACHMENT SYSTEM FOR ATTACHING A STORAGE CONTAINER TO A VEHICLE

CROSS-REFERENCE

The present application claims priority from U.S. Provisional Patent Application No. 62/877,170, filed on Jul. 22, 2019, the entirety of which is incorporated herein by reference.

TECHNICAL FIELD

The present technology relates to attachment systems for attaching a storage container to a vehicle.

BACKGROUND

Storage can be an important design consideration for vehicles, in particular for smaller vehicles which have limited storage to begin with, such as three-wheeled motor vehicles and motorcycles for example. For this reason, these vehicles are sometimes provided with a removable storage container which is selectively detachable from the vehicle.

A lock is typically provided to secure such a removable storage container to the vehicle. However, such locks can be susceptible to user error as the user may incorrectly apply the lock thus failing to properly secure the removable storage container to the vehicle, or in some cases the user may even entirely forget to apply the lock resulting in the removable storage container not being secured to vehicle. Improperly securing the removable storage container to the vehicle can in turn result in the storage container falling off the vehicle or, in some cases, in theft of the storage container.

There is therefore a desire for an attachment system for attaching a storage container to a vehicle that addresses at least some of these drawbacks.

SUMMARY

It is an object of the present technology to ameliorate at least some of the inconveniences present in the prior art.

According to one aspect of the present technology, there is provided an attachment system for attaching a storage container to a vehicle. The attachment system includes a passive attachment device for securing the storage container to the vehicle. The passive attachment device automatically secures the storage container to the vehicle when the storage container is positioned in place on the vehicle. The attachment system also includes an active attachment device manually operable by a user to selectively lock the storage container in place on the vehicle when the storage container is secured to the vehicle via the passive attachment device. The active attachment device prevents motion of the storage container relative to the vehicle when the active attachment device is engaged so as to lock the storage container in place on the vehicle.

In some embodiments, when the storage container is secured to the vehicle by the passive attachment device and that the storage container is unlocked from the vehicle by the active attachment device, the storage container has a limited range of motion relative to a frame of the vehicle.

In some embodiments, the passive attachment device includes a movable member configured to be movably connected to a bottom side of the storage container. The movable member is movable relative to the storage container between a latched position and an unlatched position. In the latched position, the movable member restricts removal of the storage container from the vehicle. In the unlatched position, the movable member is free of engagement with the vehicle so that the storage container is removable from the vehicle.

In some embodiments, the passive attachment device also includes at least one post configured to be connected to the vehicle. The movable member defines at least one post-receiving recess, each of the at least one post-receiving recess being configured to receive therein a respective one of the at least one post. Each of the at least one post-receiving recess has a first dimension at a first portion thereof and a second dimension at a second portion thereof. In the latched position of the movable member, each of the at least one post is disposed in the first portion of a respective one of the at least one post-receiving recess. In the unlatched position of the movable member, each of the at least one post is disposed in the second portion of the respective one of the at least one post-receiving recess. The at least one post-receiving recess is sized such that: when the at least one post is in the first portion of the at least one post-receiving recess, the at least one post cannot be disengaged from the at least one post-receiving recess; and when the at least one post is in the second portion of the at least one post-receiving recess, the at least one post is disengageable from the at least one post-receiving recess.

In some embodiments, the at least one post is a plurality of posts, and the at least one post-receiving recess is a plurality of post-receiving recesses.

In some embodiments, the at least one post is two posts, and the at least one post-receiving recess is two post-receiving recesses.

In some embodiments, the movable member is configured to be slidably connected to the bottom side of the storage container.

In some embodiments, the passive attachment device also includes a biasing element configured to be mounted between the storage container and the movable member to bias the movable member toward the latched position.

In some embodiments, the biasing element is a spring.

In some embodiments, the movable member is automatically moved from the latched position to the unlatched position as the storage container is being positioned in place on the vehicle.

In some embodiments, when the storage container is being positioned in place on the vehicle, the at least one post interacts with the movable member to cause the movable member to move from the latched position to the unlatched position so as to receive the at least one post in the at least one post-receiving recess.

In some embodiments, the movable member forms a handle for the user to move the movable member from the latched position to the unlatched position in order to remove the storage container from the vehicle.

In some embodiments, when the storage container is secured to the vehicle by the passive attachment device and that the storage container is unlocked from the vehicle by the active attachment device, the storage container has a limited range of motion relative to a frame of the vehicle. The handle of the movable member is accessible via a gap formed between the storage container and the frame of the vehicle when the storage container has the limited range of motion.

In some embodiments, the movable member is configured to be connected to the storage container by a plurality of fasteners; and the movable member defines a plurality of guide slots for receiving respective ones of the fasteners therein for slidably connecting the movable member to the storage container. The fasteners are movable along the guide slots.

In some embodiments, the active attachment device includes: a quick-connect actuator configured to be handled by the user; and a locking member operatively connected to the quick-connect actuator. The locking member is configured to be inserted into a lock opening defined by the vehicle. The quick-connect actuator and the locking member are configured to be mounted to the storage container. The locking member is displaceable by the user between a locked position and an unlocked position via the quick-connect actuator. In the locked position of the locking member, the locking member is irremovable through the lock opening defined by the vehicle such that the active attachment device locks the storage container in place on the vehicle. In the unlocked position of the locking member, the locking member is removable through the lock opening defined in by the vehicle such that the active attachment device unlocks the storage container from the vehicle.

In some embodiments, locking member is rotatable between the locked position and the unlocked position.

In some embodiments, when the passive attachment device secures the storage container to the vehicle and the locking member the locking member is displaced to the unlocked position, the storage container remains secured to the vehicle via the passive attachment device.

In some embodiments, the locking member of the active attachment device is configured to protrude from a bottom side of the storage container and be inserted into the opening defined by the vehicle. The quick-connect actuator is configured be accessible via an interior space defined by the storage container.

In some embodiments, also includes: a first connection structure configured to be connected to the vehicle; and a second connection structure configured to be connected to the storage container. The second connection structure is engaged with and supported by the first connection structure when the storage container is positioned in place on the vehicle. The first and second connection structures are shaped complementarily so as to prevent the second connection structure from being lifted upwardly when the second connection structure is engaged with the first connection structure.

In some embodiments, the first connection structure is one of a shaft assembly and a hook connector. The second connection structure is an other one of the shaft assembly and the hook connector.

In some embodiments, the second connection structure is pivotable about an axis defined by the first connection structure.

According to another aspect of the present technology, there is provided a vehicle. The vehicle includes: a frame; at least one front ground-engaging member operatively connected to the frame; at least one rear ground-engaging member operatively connected to the frame; a seat supported by the frame; and a storage container supported by and secured to the frame. The vehicles also includes a passive attachment device securing the storage container to the frame. The passive attachment device automatically secures the storage container to the frame when the storage container is positioned in place. The vehicle also includes an active attachment device manually operable by a user to selectively lock the storage container in place when the storage container is secured to the frame via the passive attachment device. The active attachment device prevents motion of the storage container relative to the frame when the active attachment device is engaged so as to lock the storage container in place.

In some embodiments, when the storage container is secured to the frame by the passive attachment device and that the storage container is unlocked from the frame by the active attachment device. The storage container has a limited range of motion relative to the frame.

In some embodiments, the passive attachment device includes a movable member movably connected to a bottom side of the storage container. The movable member is movable relative to the storage container between a latched position and an unlatched position. In the latched position, the movable member restricts removal of the storage container with a remainder of the vehicle. In the unlatched position, the movable member is free of engagement with the vehicle so that the storage container is removable from the remainder of the vehicle.

In some embodiments, the passive attachment device also includes at least one post connected to the frame. The movable member defines at least one post-receiving recess, each of the at least one post-receiving recess being configured to receive therein a respective one of the at least one post. Each of the at least one post-receiving recess has a first dimension at a first portion thereof and a second dimension at a second portion thereof. In the latched position of the movable member, each of the at least one post is disposed in the first portion of a respective one of the at least one post-receiving recess. In the unlatched position of the movable member, each of the at least one post is disposed in the second portion of the respective one of the at least one post-receiving recess. The at least one post-receiving recess is sized such that: when the at least one post is in the first portion of the at least one post-receiving recess, the at least one post cannot be disengaged from the at least one post-receiving recess; and when the at least one post is in the second portion of the at least one post-receiving recess, the at least one post is disengageable from the at least one post-receiving recess.

In some embodiments, the at least one post is a plurality of posts, and the at least one post-receiving recess is a plurality of post-receiving recesses.

In some embodiments, the at least one post is two posts, and the at least one post-receiving recess is two post-receiving recesses.

In some embodiments, the movable member is slidably connected to the bottom side of the storage container.

In some embodiments, the passive attachment device also includes a biasing element mounted between the storage container and the movable member to bias the movable member toward the latched position.

In some embodiments, the biasing element is a spring.

In some embodiments, the movable member is automatically moved from the latched position to the unlatched position as the storage container is being positioned in place.

In some embodiments, when the storage container is being positioned in place, the at least one post interacts with the movable member to cause the movable member to move from the latched position to the unlatched position so as to receive the at least one post in the at least one post-receiving recess.

In some embodiments, the movable member forms a handle for the user to move the movable member from the latched position to the unlatched position in order to remove the storage container from the remainder of the vehicle.

In some embodiments, when the storage container is secured to the vehicle by the passive attachment device and that the storage container is unlocked from the frame by the active attachment device, the storage container has a limited range of motion relative to the frame. The handle of the movable member is accessible via a gap formed between the storage container and the frame when the storage container has the limited range of motion.

In some embodiments, the movable member is connected to the storage container by a plurality of fasteners, and the movable member defines a plurality of guide slots receiving respective ones of the fasteners therein for slidably connecting the movable member to the storage container. The fasteners are movable along the guide slots.

In some embodiments, the active attachment device includes: a quick-connect actuator configured to be handled by the user and a locking member connected to the quick-connect actuator. The quick-connect actuator and the locking member are mounted to the storage container. The frame defines a lock opening, and the locking member being inserted through the lock opening. The locking member is displaceable by the user between a locked position and an unlocked position via the quick-connect actuator. In the locked position of the locking member, the locking member is irremovable through the lock opening such that the active attachment device locks the storage container in place. In the unlocked position of the locking member, the locking member is removable through the lock opening such that the active attachment device unlocks the storage container from a remainder of the vehicle.

In some embodiments, the locking member is rotatable between the locked position and the unlocked position.

In some embodiments, the locking member of the active attachment device protrudes from a bottom side of the storage container; and the quick-connect actuator is accessible via an interior space defined by the storage container.

In some embodiments, the vehicle also includes a first connection structure connected to the frame. The storage container includes a second connection structure engaged with and supported by the first connection structure. The first and second connection structures are shaped complementarily so as to prevent the second connection structure from being lifted upwardly when the second connection structure is engaged with the first connection structure.

In some embodiments, the first connection structure is one of a shaft assembly and a hook connector. The second connection structure is an other one of the shaft assembly and the hook connector.

In some embodiments, the second connection structure is pivotable about an axis defined by the first connection structure.

In some embodiments, the one of the shaft assembly and the hook connector is the shaft assembly. The other one of the shaft assembly and the hook connector is the hook connector. The storage container has a front wall, a rear wall, a left side wall and a right side wall. The hook connector extends forwardly from the front wall of the storage container.

In some embodiments, the shaft assembly includes two shaft sections coaxially aligned with one another. The hook connector includes two hooks, each hook being supported by one of the two shaft sections of the shaft assembly.

In some embodiments, the storage container is disposed rearward of the seat.

In some embodiments, the storage container has a lid enclosing at least in part an interior space of the storage container. At least part of the active attachment device is accessible from the interior space of the storage container.

According to another aspect of the present technology, there is provided a storage container assembly for a vehicle. The storage container assembly includes a storage container defining an interior space. The storage container has a bottom side. The storage container assembly also includes a passive attachment device for securing the storage container to the vehicle. The passive attachment device is connected to the bottom side of the storage container. The passive attachment device automatically secures the storage container to the vehicle when the storage container is positioned in place on the vehicle. The storage container assembly also includes an active attachment device manually operable by a user to selectively lock the storage container in place on the vehicle when the storage container is secured to the vehicle via the passive attachment device. The active attachment device prevents motion of the storage container relative to the vehicle when the active attachment device is engaged so as to lock the storage container in place on the vehicle.

For purposes of this application, terms related to spatial orientation such as forward, rearward, upward, downward, left, and right, as they are used in this document refer to general directions as would be understood by a driver of a vehicle sitting in a driver seat of the vehicle and facing in a straight forward driving direction. Terms related to spatial orientation when describing or referring to components or sub-assemblies of a vehicle separately from the vehicle should be understood as they would be understood when these components or sub-assemblies are mounted to the vehicle, unless specified otherwise in this application.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology will be described herein with respect to a three-wheeled straddle-type vehicle 100. It is contemplated that the present technology could also be implemented with vehicles that have two, four, or more wheels, as well as with other types of vehicles including, but not limited to, snowmobiles.

Figure 1:
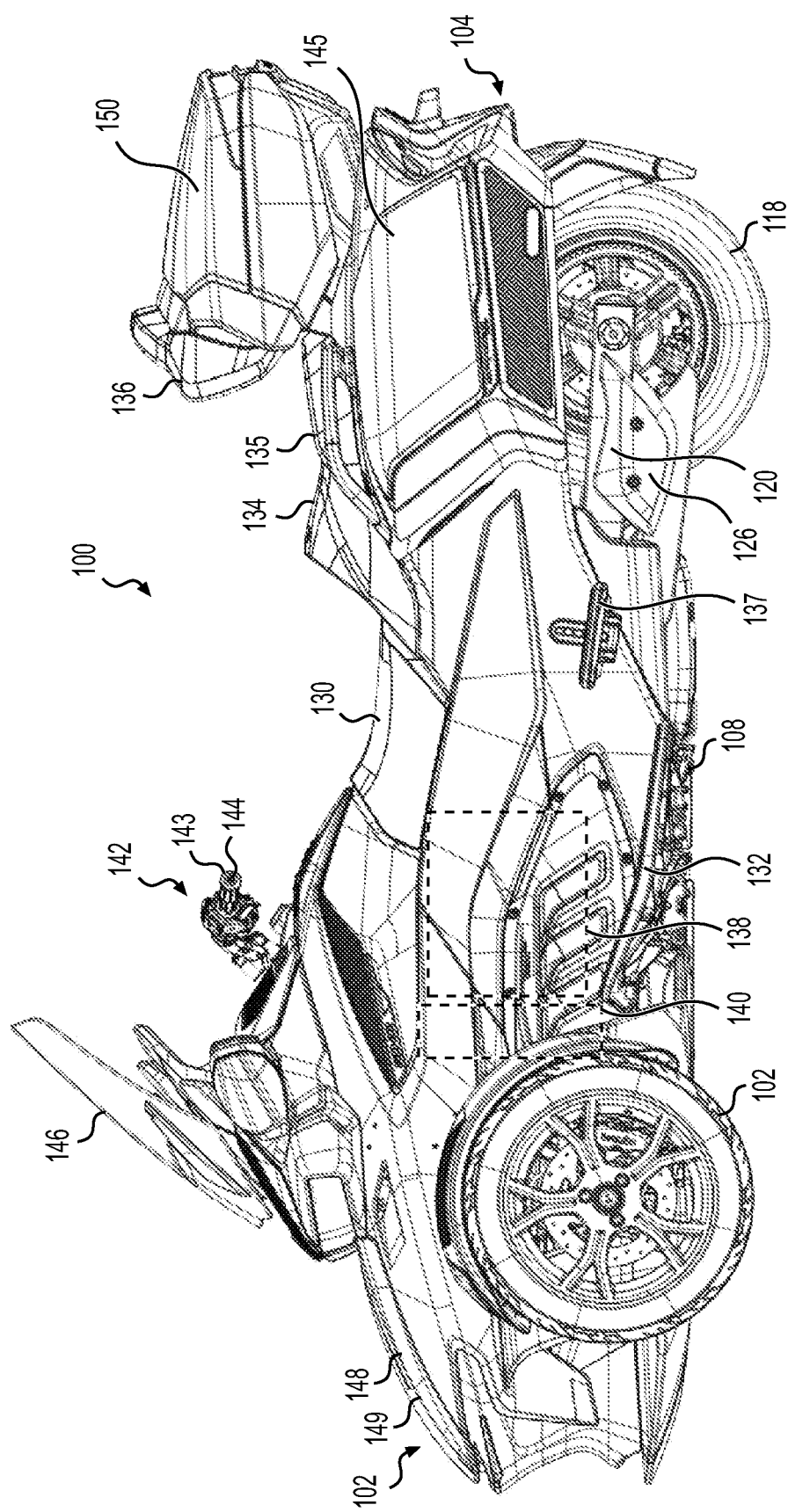
FIG. 1 is a left side elevation view of a vehicle.

With reference to FIG. 1, the vehicle 100 has a front end 102, a rear end 104, and a longitudinal centerplane (not shown) defined consistently with the forward travel direction of the vehicle 100. The vehicle 100 has a frame 108 for supporting the various components of the vehicle 100, and left and right front wheels 110 (the left front wheel being shown in FIG. 1) mounted to the frame 108. In particular, the left front wheel 110 is mounted to the frame 108 on a left side thereof by a left front suspension assembly (not shown), while the right front wheel 110 is mounted to the frame 108 on a right side thereof by a right front suspension assembly (not shown). More specifically, the left and right front wheels 110 are rotatably mounted to left and right steering knuckles which are supported by the left and right front suspension assemblies. A single rear wheel 118 is mounted to the frame 108 at a rear end thereof by a rear suspension assembly 120. The left and right front wheels 110 and the rear wheel 118 each have a tire secured thereto. The front wheels 110 are disposed equidistant from the longitudinal centerplane, and the rear wheel 118 is centered with respect to the longitudinal centerplane.

In this embodiment, each front suspension assembly is a double A-arm type suspension, also known as a double wishbone suspension, and includes a corresponding shock absorber. It is contemplated that other types of front suspensions, such as a McPherson strut suspension, or swing arm could be used. The rear suspension assembly 120 includes a swing arm 126 and a shock absorber (not shown). The shock absorber is connected between the swing arm 126 and the frame 108. It is contemplated that other types of rear suspensions could be used.

Figure 2:
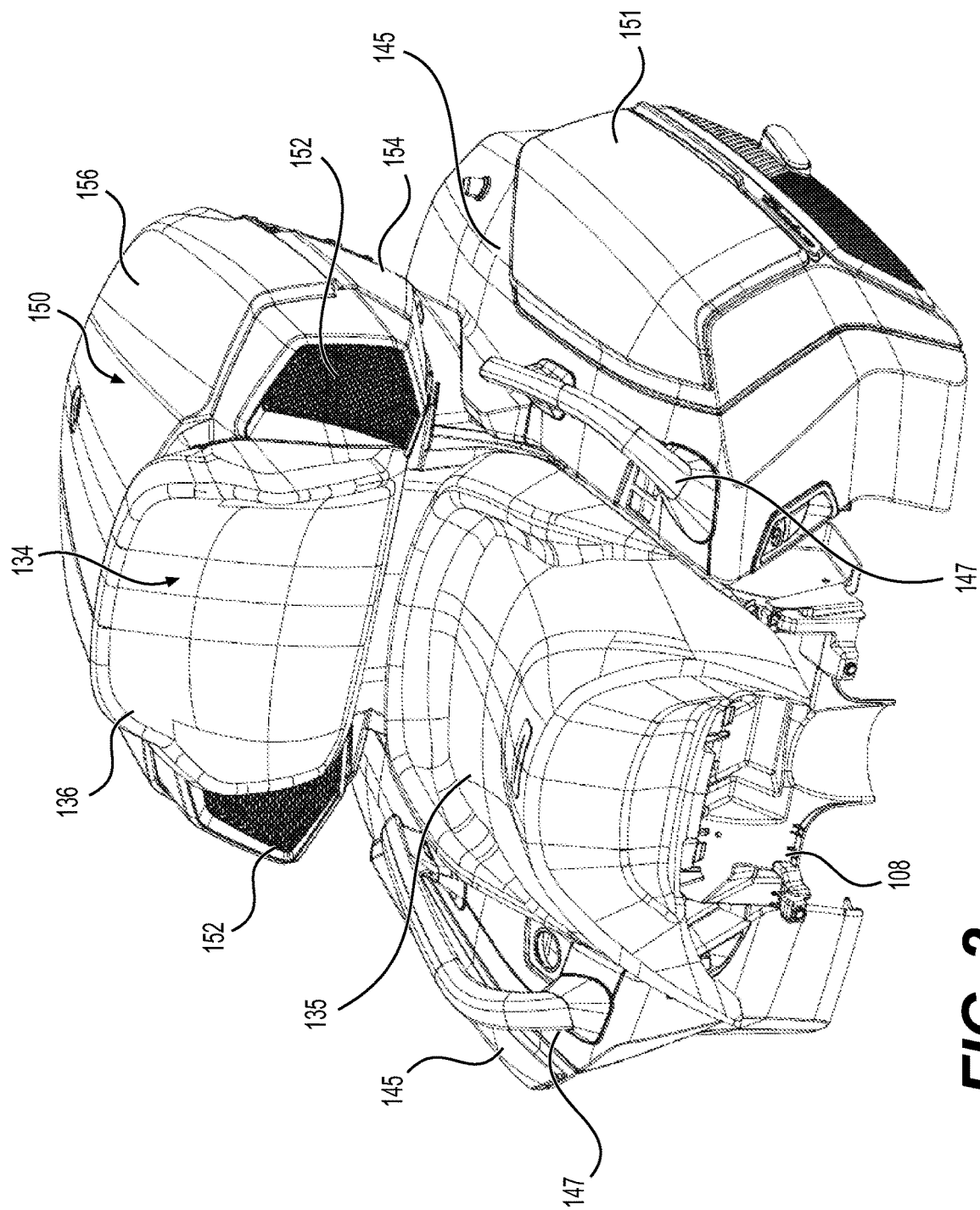
FIG. 2 is a perspective view, taken from a front, left side, of a part of the vehicle of FIG. 1, including a passenger seat and storage containers of the vehicle.
Figure 3:
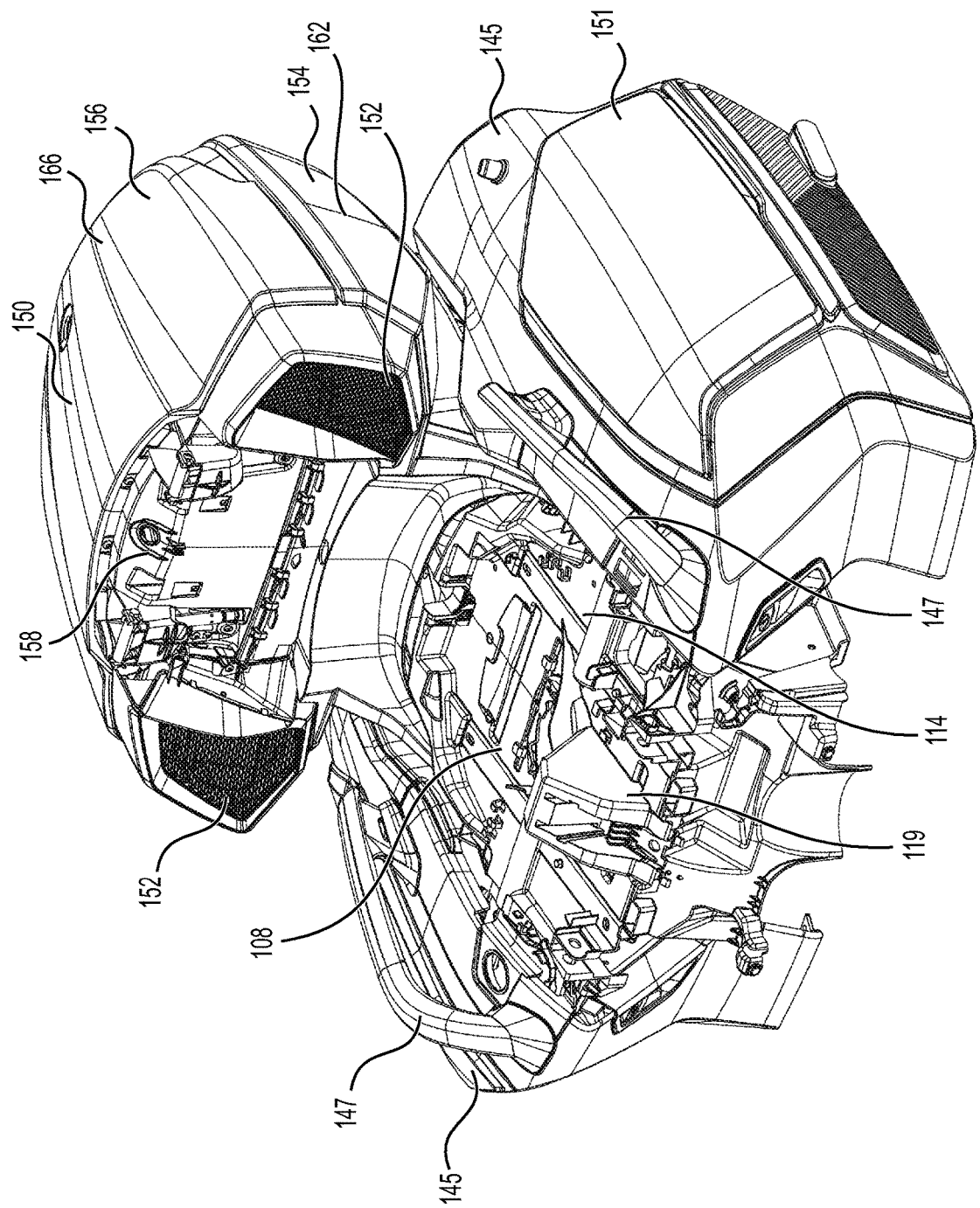
FIG. 3 is a perspective view, taken from a front, left side, of the part of the vehicle of FIG. 2, with the passenger seat removed to expose an underlying portion of a frame of the vehicle.

The vehicle 100 has a driver seat 130 mounted to an upper portion of the frame 108 and disposed along the longitudinal centerplane. The vehicle 100 also has a passenger seat 134 disposed rearward of the driver seat 130. As best shown in FIG. 2, the passenger seat 134 has a seat portion 135 and a backrest portion 136 for supporting the back of a passenger in the passenger seat 134. The seat portion 135 of the passenger seat 134 is supported by and connected to a rear upper frame member 114 of the frame 108, as shown in FIG. 3 which illustrates a rear part of the vehicle 100 with the passenger seat 135 removed therefrom. In this embodiment, the driver and passenger seats 130, 134 are straddle seats.

Driver footrests 132 are disposed on both sides of the vehicle 100 to support the driver's feet. The driver footrests 132 are connected to a lower portion of the frame 108. In this embodiment, the driver footrests 132 are in the form of footboards extending longitudinally forward of the driver seat 130. The vehicle 100 is also provided with passenger footrests 137 disposed rearward of the driver footrests 132 on both sides of the vehicle 100, for supporting the passenger's feet. A brake pedal (not shown) is connected to the right driver footrest 132 for braking the vehicle 100.

As schematically illustrated in FIG. 1, the vehicle 100 has a power pack, including a motor 138 and a transmission assembly 140. The power pack is supported by and is housed within the frame 108. The transmission assembly 140 includes a semi-automatic transmission. The motor 138 is in the form of an internal combustion engine. It is however contemplated that the motor 138 could be other than an internal combustion engine, for example an electric motor, a hybrid or the like. It is also contemplated that the transmission assembly 140 could be of another type, such as a manual transmission or a continuously variable transmission (CVT). The motor 138 is operatively connected to the rear wheel 118 via the transmission assembly 140 to drive the rear wheel 118.

With continued reference to FIG. 1, the vehicle 100 has a steering system 142 that includes a handlebar assembly 143, a steering column assembly (not shown) connected to the handlebar assembly 143, and a plurality of linkages operatively connecting the steering column assembly to the steering knuckles.

The handlebar assembly 143 includes a handlebar 144 which is disposed forward of the driver seat 130. A left hand grip is placed around the left side of the handlebar 144 near the left end thereof and a right hand grip is placed around the right side of the handlebar 144 near the right end thereof. The right hand grip has a twist-grip type throttle control. It is contemplated that a different type and/or position of throttle control could be used. The handlebar 144 is operatively connected to the front wheels 110 via the steering column assembly. The steering system defines a steering axis about which the handlebar 144 rotates with respect to the frame 108. The handlebar 144 is turned by the driver about the steering axis to steer the front wheels 110 and thereby steer the vehicle 100.

It should be understood that the front wheels 110 are one example of steerable ground-engaging members with which embodiments of the steering system 142 could be used. It is contemplated that embodiments of the steering system 142 could be used on vehicles where the steerable ground-engaging component(s) is/are skis or endless tracks for example.

The vehicle 100 also has a plurality of fairings 148 that enclose the motor 138 and the transmission assembly 140, thereby providing an external shell that not only protects the engine 138 and the transmission assembly 140, but also make the vehicle 100 more aesthetically pleasing. The fairings 148 include a hood 149 and one or more side panels which can be opened to allow access to the motor 138 and the transmission assembly 140 when required, for example for inspection or maintenance thereof. A windshield 146 is connected to the fairings 148 near the front end 102 of the vehicle 100. The windshield 146 acts as a windscreen to lessen the force of the air on the driver while the vehicle 100 is moving.

The vehicle 100 includes various other components which are known in the art and therefore will not be described in detail herein.

In this embodiment, as shown in FIGS. 1 and 2, the vehicle 100 is also provided with lateral side storage containers 145 disposed at either lateral side of the vehicle 100, near the rear end 104 of the vehicle 100. The side storage containers 145 may also be referred to as "saddlebags". As shown in FIG. 2, each saddlebag 145 extends on either lateral side of the seat portion 135 of the passenger seat 134 and is supported by the frame 108. Each saddlebag 145 has an access door 151 on an outer lateral side thereof which can be selectively opened to access an interior space defined by the saddlebag 145.

Figure 4:
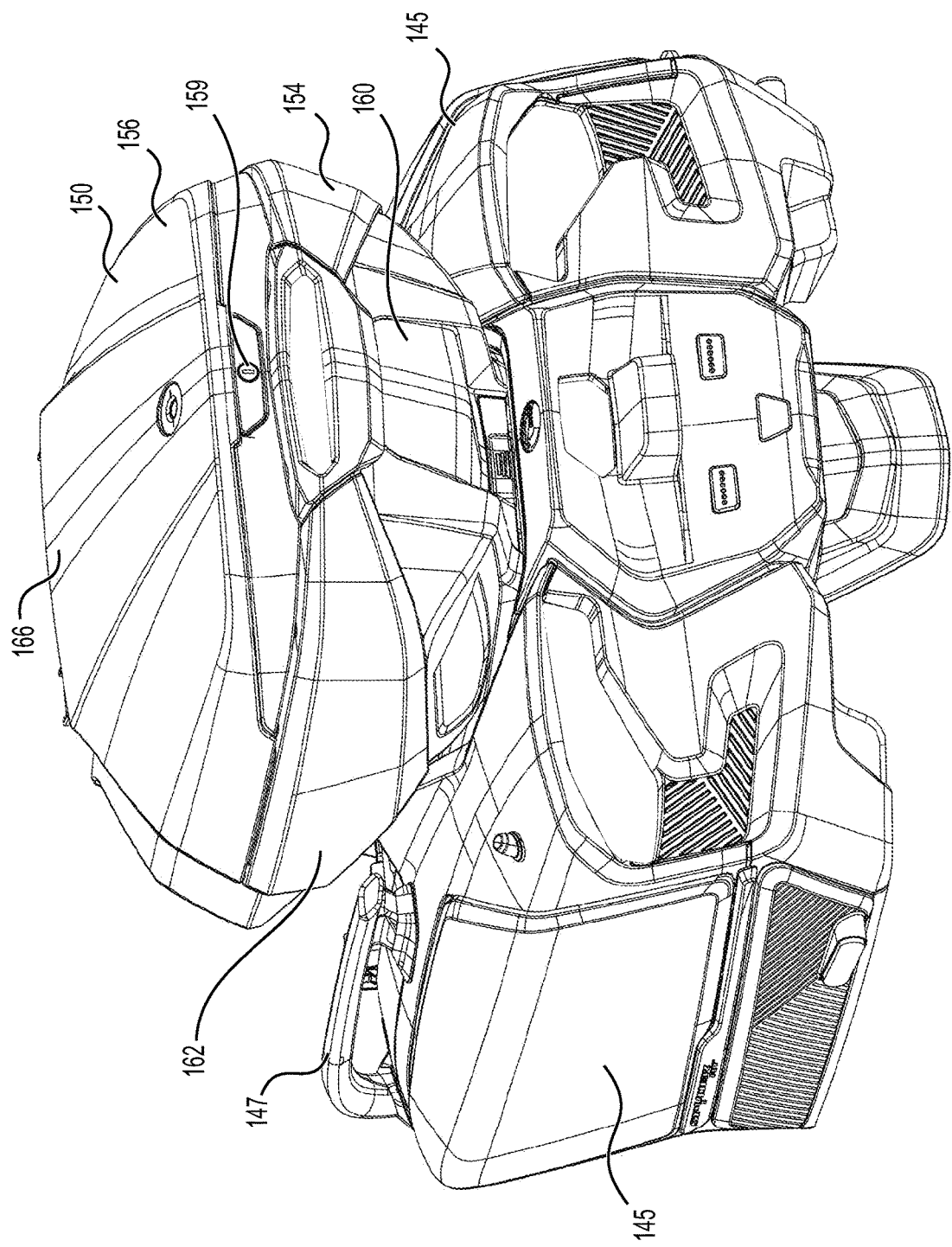
FIG. 4 is a perspective view, taken from a rear, left side, of the part of the vehicle of FIG. 3.
Figure 7:
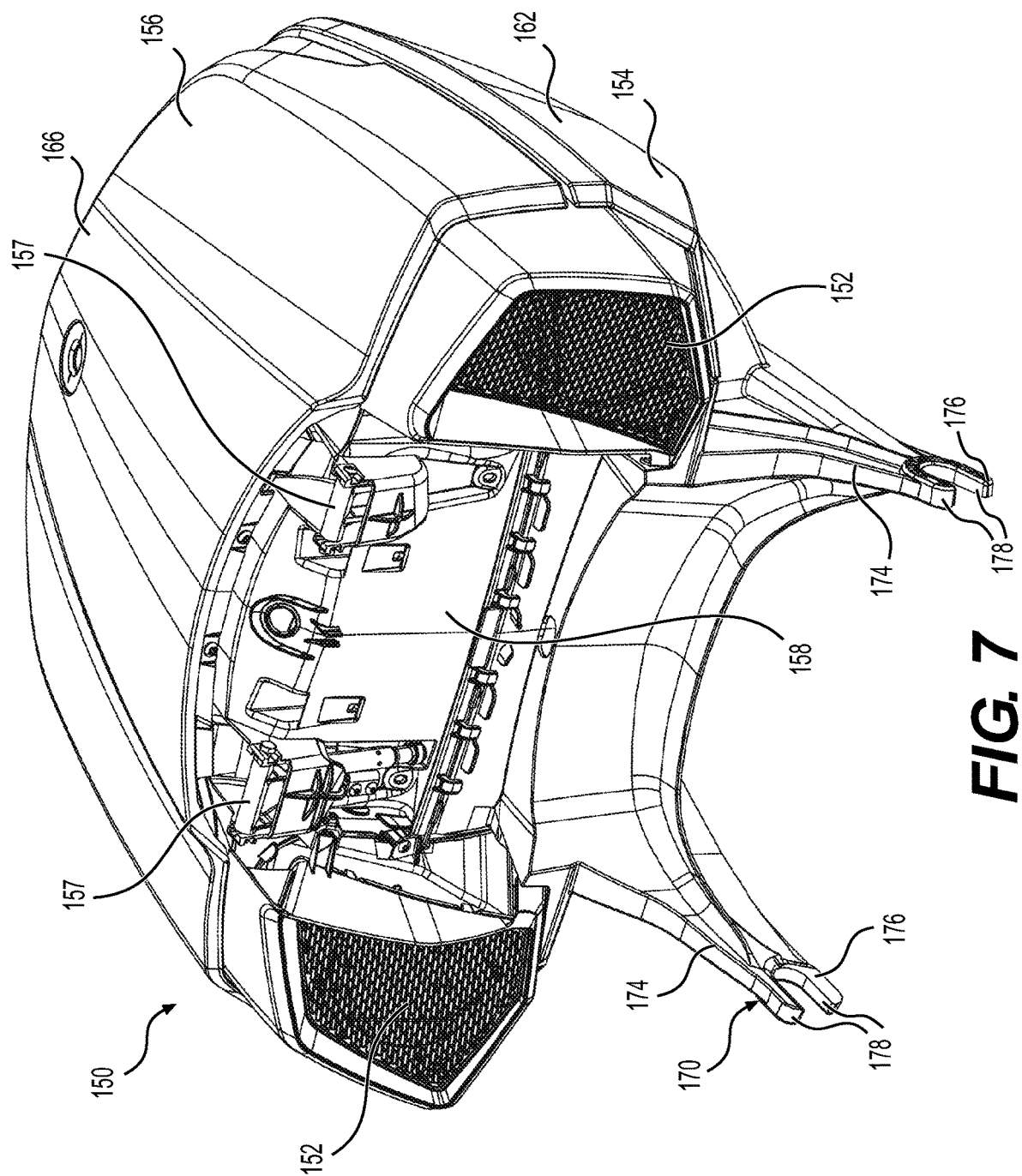
FIG. 7 is a perspective view, taken from a front, left side, of the top storage container of the vehicle of FIG. 1.
Figure 8:
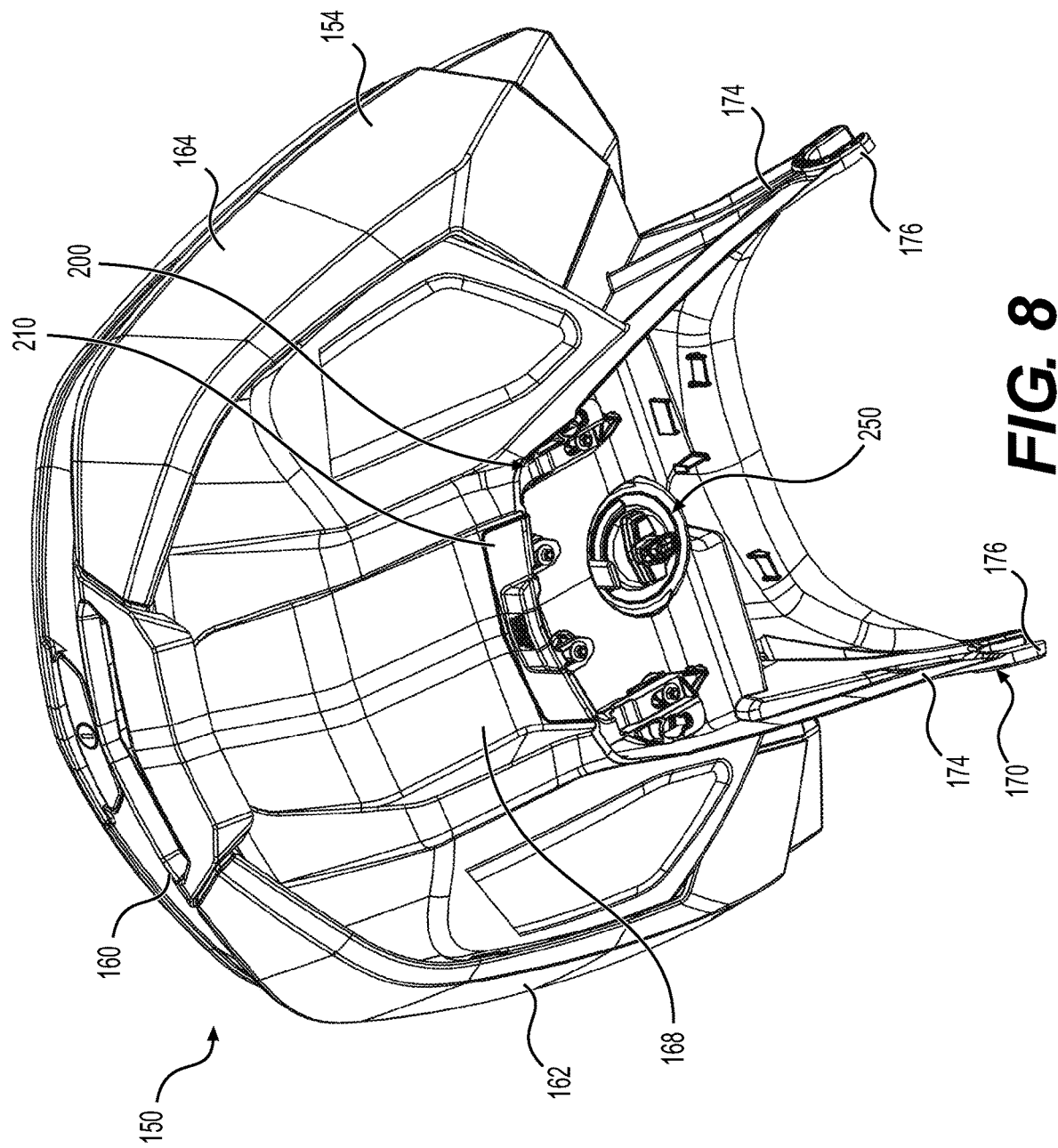
FIG. 8 is a perspective view, taken from a rear, bottom, right side, of the top storage container of FIG. 7.

The vehicle 100 is also provided with a top storage container 150, commonly referred to as a top case 150, which is disposed rearward of the seat portion 135 of the passenger seat 134 and laterally centered on the vehicle 100. More specifically, the top storage container 150 is received on the rear upper frame member 114. The top storage container 150 is selectively removable from the remainder of the vehicle 100. The top storage container 150 has a base portion 154 and a lid portion 156 hingedly connected to the base portion 154 about a hinge 157 (FIG. 7). The lid portion 156 can be opened (i.e., pivoted about the hinge 157) to access an interior space 155 (FIG. 9) defined by the storage container 150. A key-receiving member 159 (FIG. 4) is provided to receive a key to unlock the lid portion 156 from the base portion 154. With reference to FIGS. 3, 4 and 8, the top storage container 150 has a front wall 158, a rear wall 160, a left side wall 162 and a right side wall 164, a top wall 166 and a bottom wall 168. Each of the walls 158, 160, 162, 164, 166, 168 is formed by one or both of the base portion 154 and the lid portion 156.

In this embodiment, the top storage container 150 has two speakers 152 on a front side thereof and positioned such that one of the speakers 152 is on either lateral side of the passenger seat 134. Furthermore, the backrest portion 136 of the passenger seat 134 is connected to the front wall 158 of the storage container 150. As such, the backrest portion 136 of the illustrated embodiment may be provided only when the top storage container 150 is provided on the vehicle 100.

As shown in FIG. 7, a container connection structure 170 is connected to the storage container 150 and is configured to engage a complementary frame connection structure 172 that is connected to the frame 108 of the vehicle 100 such as to be supported thereby when the storage container 150 is positioned in place on the vehicle 100. More specifically, as will be described below, the connection structures 170, 172 are shaped complementarily so as to contribute to preventing the container connection structure 170 from being lifted upwardly when the connection structures 170, 172 are engaged with one another.

Figure 5:
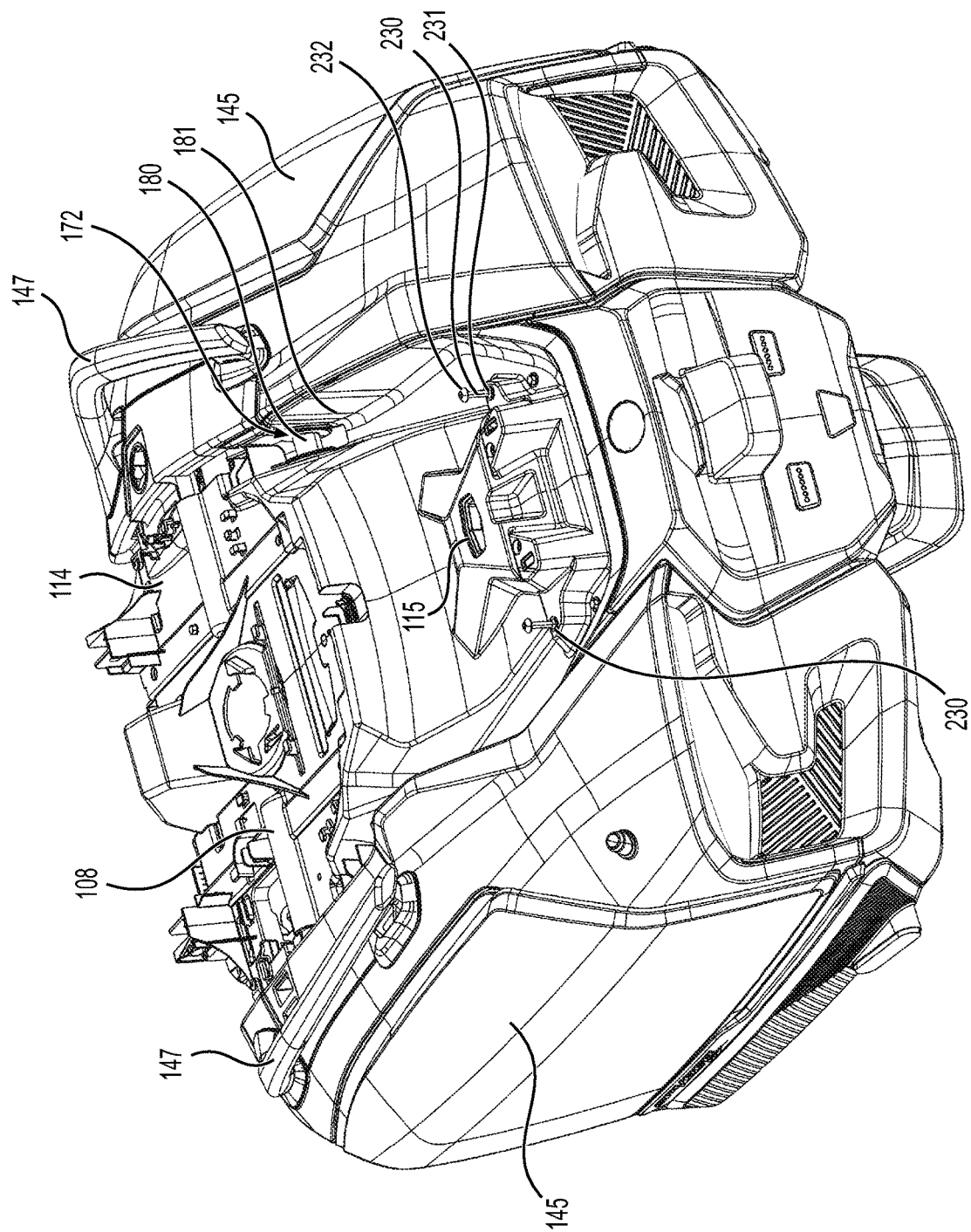
FIG. 5 is a perspective view, taken from a rear, left side, of the part of the vehicle of FIG. 3, with a top storage container of the vehicle removed.
Figure 6:
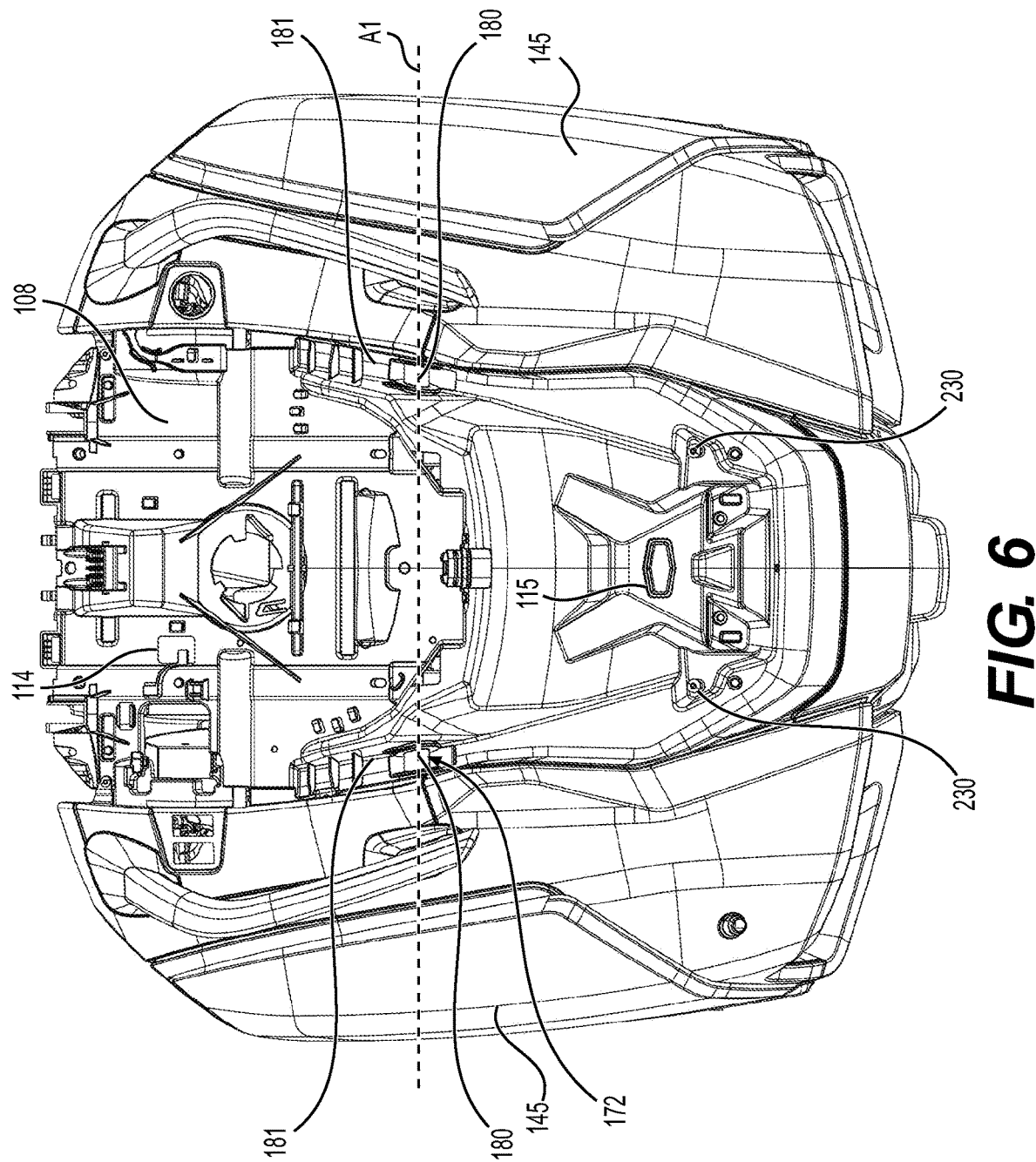
FIG. 6 is a top plan view of the part of the vehicle of FIG. 5.

In particular, in this embodiment, the container connection structure 170 is a hook connector 170 that extends forwardly from the front side of the storage container 150. In this embodiment, the hook connector 170 includes two arms 174 and two hooks 176 disposed at the ends of the arms 174. Each of the hooks 176 has two prongs 178 for hooking onto the frame connection structure 172. Furthermore, with reference to FIGS. 5 and 6, in this embodiment, the frame connection structure 172 is a shaft assembly 172 including two shaft portions 180 which extend laterally and are longitudinally aligned with one another to define an axis A1 (FIG. 6). More specifically, the shaft portions 180 are disposed in respective recesses 181 defined by the rear upper frame member 114 of the frame 108. The hook connector 170 is pivotable about the axis A1 defined by the shaft assembly 172.

The connection structures 170, 172 are the parts that are first engaged with one another in order to install the storage container 150 onto the vehicle 100. In particular, in order to install the storage container 150 on the vehicle 100, the hooks 176 are engaged with the shaft portions 180 and the storage container 150 is then pivoted downwards about the axis A1.

It is contemplated that, in other embodiments, the connection structures 170, 172 may be inversed such that the hook connector 170 is connected to the frame 108 while the shaft assembly 172 is connected to the storage container 150.

As will be described below, an attachment system is provided for attaching the storage container 150 to the frame 108 of the vehicle 100 in conjunction with the connection structures 170, 172. More specifically, the attachment system includes two separate and distinct attachment devices 200, 250 for securely attaching the storage container 150 to the vehicle 100. The first attachment device 200 will be hereinafter referred to as a "passive attachment device" as the device 200 is automatically actuated when the storage container 150 is positioned in place on the frame 108 of the vehicle 100, without requiring user operation thereof. In contrast, the second attachment device 250 will be hereinafter referred to as an "active attachment device" as the device 250 is operable by the user to lock the storage container to the frame 108 of the vehicle 100.

Figure 11:
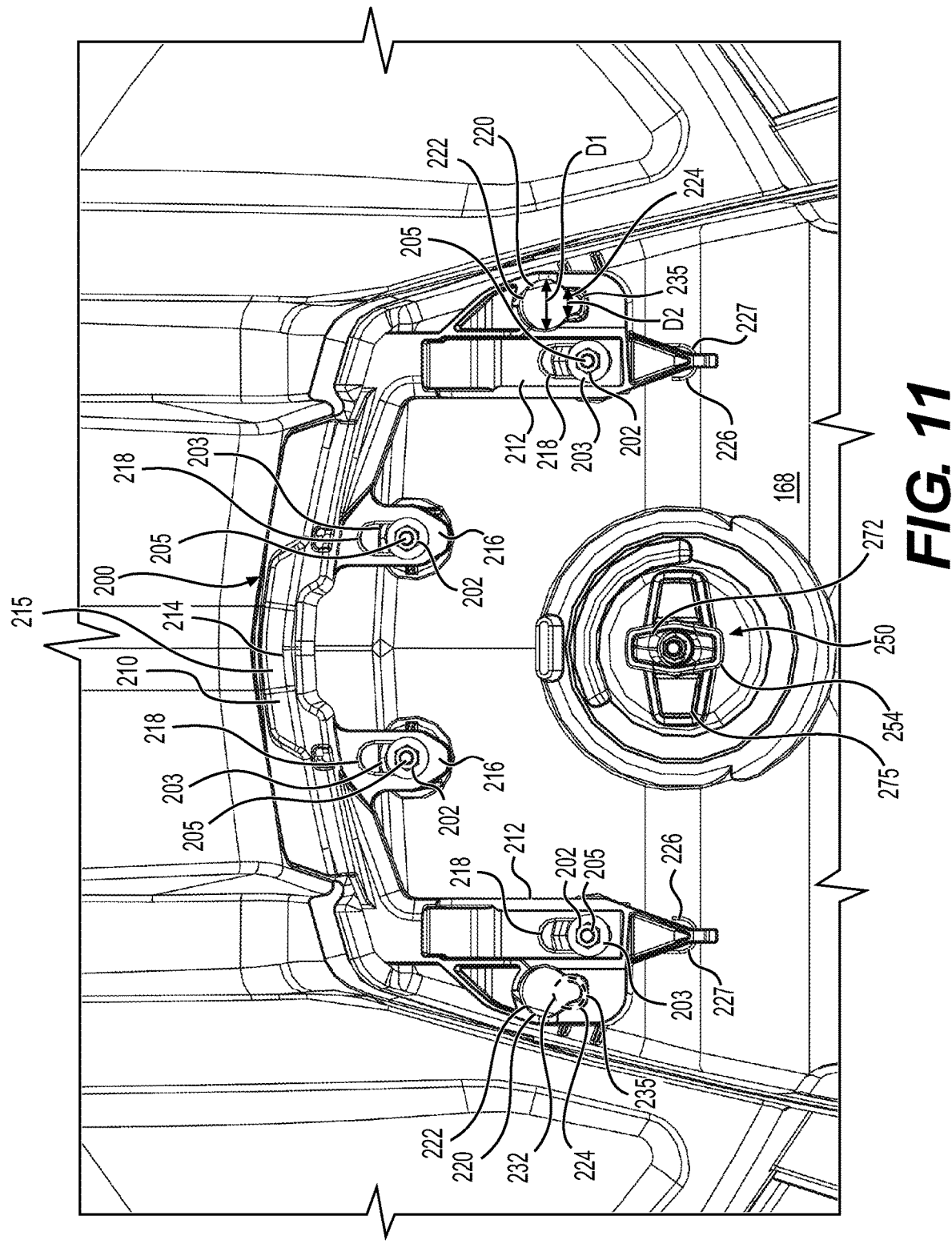
FIG. 11 is a bottom plan view of the top storage container of FIG. 7, with a movable member of a passive attachment device connected thereto shown in a latched position.
Figure 14:
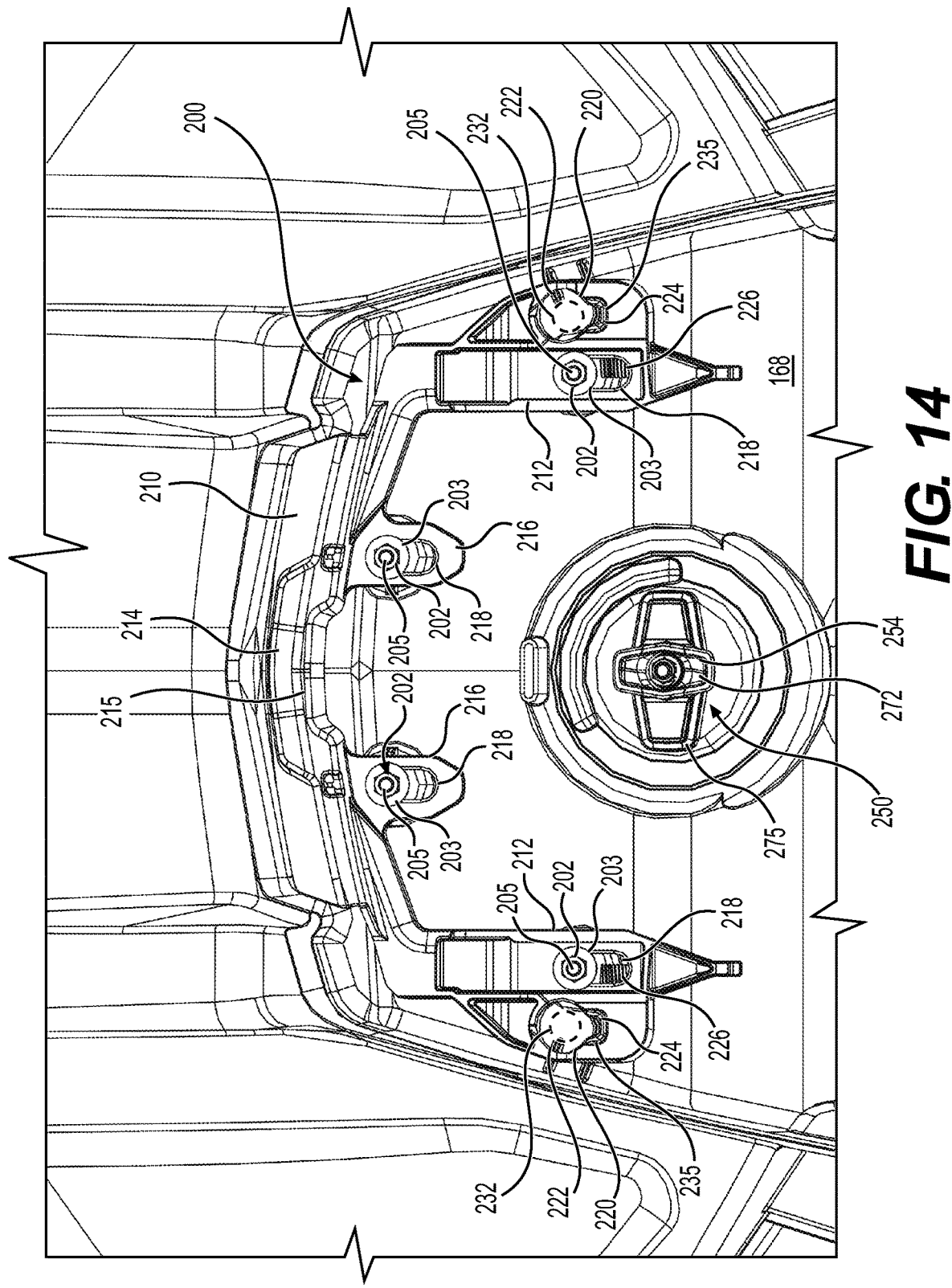
FIG. 14 is a bottom plan view of the top storage container of FIG. 7, with the movable member shown in the unlatched position.

With reference to FIG. 8, the passive attachment device 200 includes a movable member 210 that is movably connected to the bottom side of the storage container 150. More specifically, as shown in FIGS. 11 and 14, the movable member 210 is fastened to the bottom side of the storage container 150 via fasteners 202, 205. The movable member 210 is slidable relative to the storage container 150 between a latched position (illustrated in FIGS. 11 and 12) and an unlatched position (illustrated in FIGS. 14 and 15). In the latched position, the movable member 210 restricts removal of the storage container 150 from the vehicle 100. On the other hand, in the unlatched position, the movable member 210 is free of engagement with the vehicle 100 so that the storage container 150 is removable from the vehicle 100. The manner in which the movable member 210 moves from the unlatched position to the latched position and vice-versa will be described in greater detail below.

As shown in FIG. 11, in this embodiment, the movable member 210 is generally U-shaped, having two arm portions 212 and a central portion 214 interconnecting the arm portions 212. The central portion 214 forms a handle 215 for the user to move the movable member 210 from the latched position to the unlatched position to remove the storage container 150 from the vehicle 100, as will be described in greater detail below. The handle 215 is shaped and dimensioned to be easy to engage by a hand of the user. The movable member 210 also has two longitudinal extensions 216 extending from the central portion 214 in the same direction as the arm portions 212. The movable member 210 is symmetrical about a plane extending through the central portion 214.

In order to connect the movable member 210 to the storage container 150, the movable member 210 defines four guide slots 218 extending longitudinally and configured to receive fasteners 205 attached to the storage container 150. Two central ones of the guide slots 218 are defined in the longitudinal extensions 216 while two outer ones of the guide slots 218 are defined near the ends of the arm portions 212.

The manner in which the movable member 210 is connected to the storage container 150 will now be described with reference to FIG. 13. In this embodiment, the fasteners 205 are bolts which are fixedly connected to the bottom wall 168 of the storage container 150. The bolts 205 are received within respective guide protrusions 207 extending downwardly from the bottom wall 168 of the storage container 150. The guide protrusions 207 thus act as sleeves for the bolts 205. A head of each bolt 205 is lodged by an inner shoulder formed at the base of each guide protrusion 207 so that each bolt 205 is fixed in place. Each guide protrusion 207 is received in a corresponding guide slot 218 for guiding movement thereof. A portion of each bolt 205 extends beyond the end of the corresponding guide protrusion 207. A washer 203 is placed around the portion of each fastener 205 and sandwiched by a nut 202 against the distal end of the corresponding guide protrusion 207. The washers 203 thus prevent the nuts 202 from entering the guide slots 218 and the movable member 210 from separating from the remainder of the storage container 150. The guide protrusions 207 and the movable member 210 are sized and shaped such that the movable member 210 is connected to the storage container 150 while simultaneously allowing motion of the movable member 210 with respect thereto. In particular, in this manner, the engagement of the guide slots 218 with the guide protrusions 207 and the bolts 205 allows sliding motion of the movable member 210 relative to the storage container 150, as guided by the guide slots 218.

Figure 12:
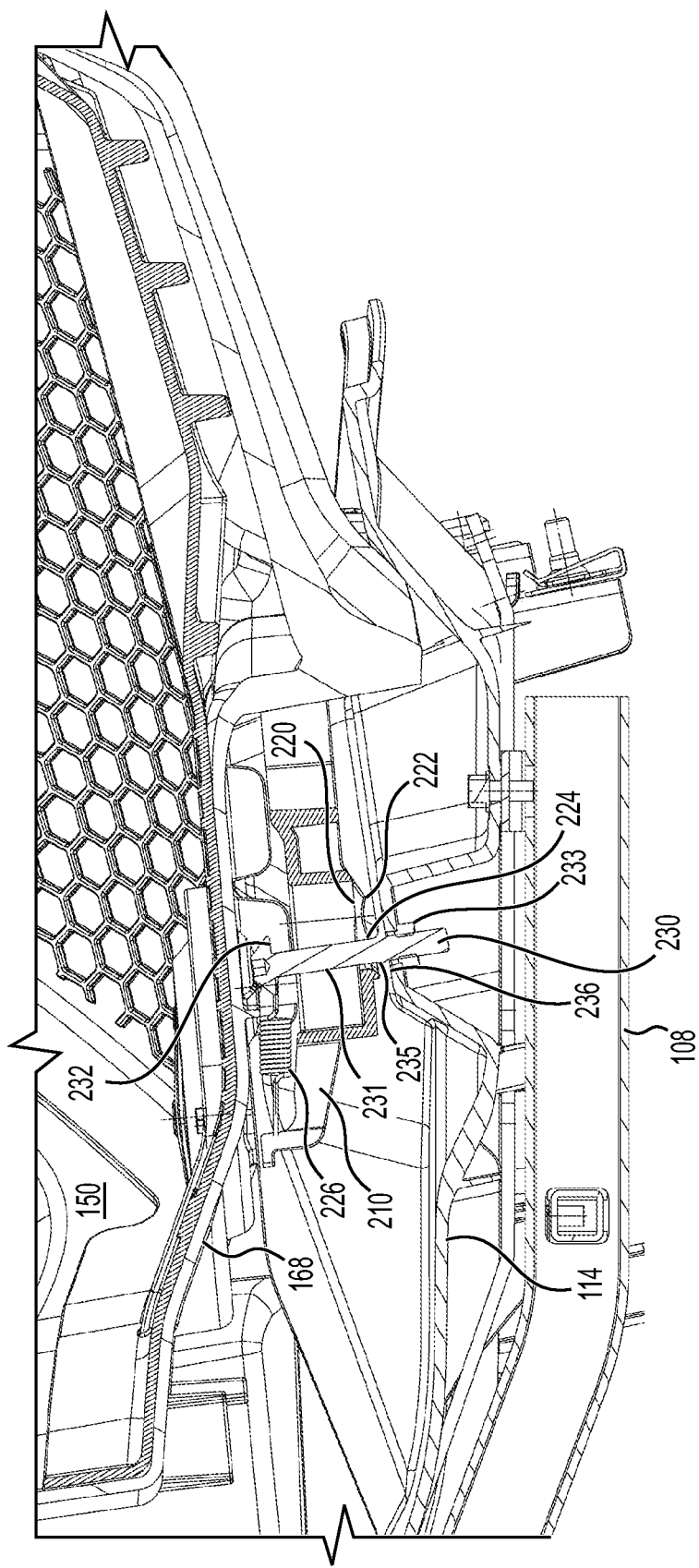
FIG. 12 is a cross-sectional view of part of the top storage container, the movable member and part of the frame of the vehicle when the movable member is in the latched position.

The movable member 210 also defines two post-receiving recesses 220 in the arm portions 212, laterally adjacent to respective ones of the outer guide slots 218. As will be described in greater detail below, the post-receiving recesses 220 are configured to receive therein respective posts 230 (FIGS. 5, 6) that are connected to the frame 108 of the vehicle 100. As can be seen in FIGS. 5 and 12, each post 230 extends upwardly from the rear upper frame member 114 of the frame 108 and has a stem 231 and a head 232 disposed at the upper end of the stem 231. The head 232 has a diameter that is greater than a diameter of the stem 231. The posts 230 can be connected to the frame 108 in any suitable way. For instance, in this embodiment, the lower end of the stem 231 of each post 230 is threaded and held in place on the rear upper frame member 114 by a nut 233 (FIG. 12). As best seen in FIG. 12, a skirt 236 of the post 230 is provided at a predefined distance from the lower end of the stem 231 such that the head 232 of the post 230 protrudes at a set height from the rear upper frame member 114.

The configuration of the post-receiving recesses 220 and their interaction with the posts 230 will now be described.

The post-receiving recesses 220 are identical to one another, therefore a single one of the post-receiving recesses 220 will be described herein. It is to be understood that the same description applies to both post-receiving recesses 220.

As shown in FIGS. 11 and 14, the post-receiving recess 220 is shaped and dimensioned such that when the corresponding post 230 is received in one portion of the post-receiving recess 220 (i.e., when the stem 231 of the post 230 extends through that portion of the post-receiving recess 220), the post 230 cannot be disengaged from the post-receiving recess 220, while on the other hand, when the post 230 is received in another portion of the post-receiving recess 220, the post 230 is disengageable from the post-receiving recess 220. In particular, in this embodiment, the post-receiving recess 220 is generally keyhole shaped and has an oversized portion 222 and an undersized portion 224. As shown in FIG. 11, the oversized portion 222 has a dimension D1 that is sized to permit the head 232 of the post 230 to pass therethrough. In contrast, the undersized portion 224 has a dimension D2 that is sized to prevent the head 232 of the post 230 from passing therethrough. In this embodiment, the oversized and undersized portions 222, 224 are partially circular (i.e., shaped as a part of a circle defining a radius) and thus the dimensions D1, D2 are diameters. The oversized and undersized portions 222, 224 may have any other suitable shapes.

Thus, as can be understood, when the post 230 is received in the oversized portion 222, the post 230 is disengageable from the post-receiving recess 220 as the diameter of the head 232 of the post 230 is smaller than the diameter D1 of the oversized portion 222. On the other hand, when the post 230 is received in the undersized portion 224, the post 230 cannot be disengaged from the post-receiving recess 220 as the diameter of the head 232 of the post 230 is greater than the diameter D2 of the undersized portion 224. The oversized and undersized portions 222, 224 thus correspond to the unlatched and latched positions of the movable member 210 respectively. Notably, when the movable member 210 is in the unlatched position, the post 230 is disposed in the oversized portion 222 of the post-receiving recess 230, as illustrated for reference in dashed lines in FIG. 14 and also shown in FIG. 15. When the movable member 210 is in the latched position, the post 230 is disposed in the undersized portion 224 of the post-receiving recess 220, as illustrated for reference in FIG. 11 and also shown in FIG. 12.

Figure 15:
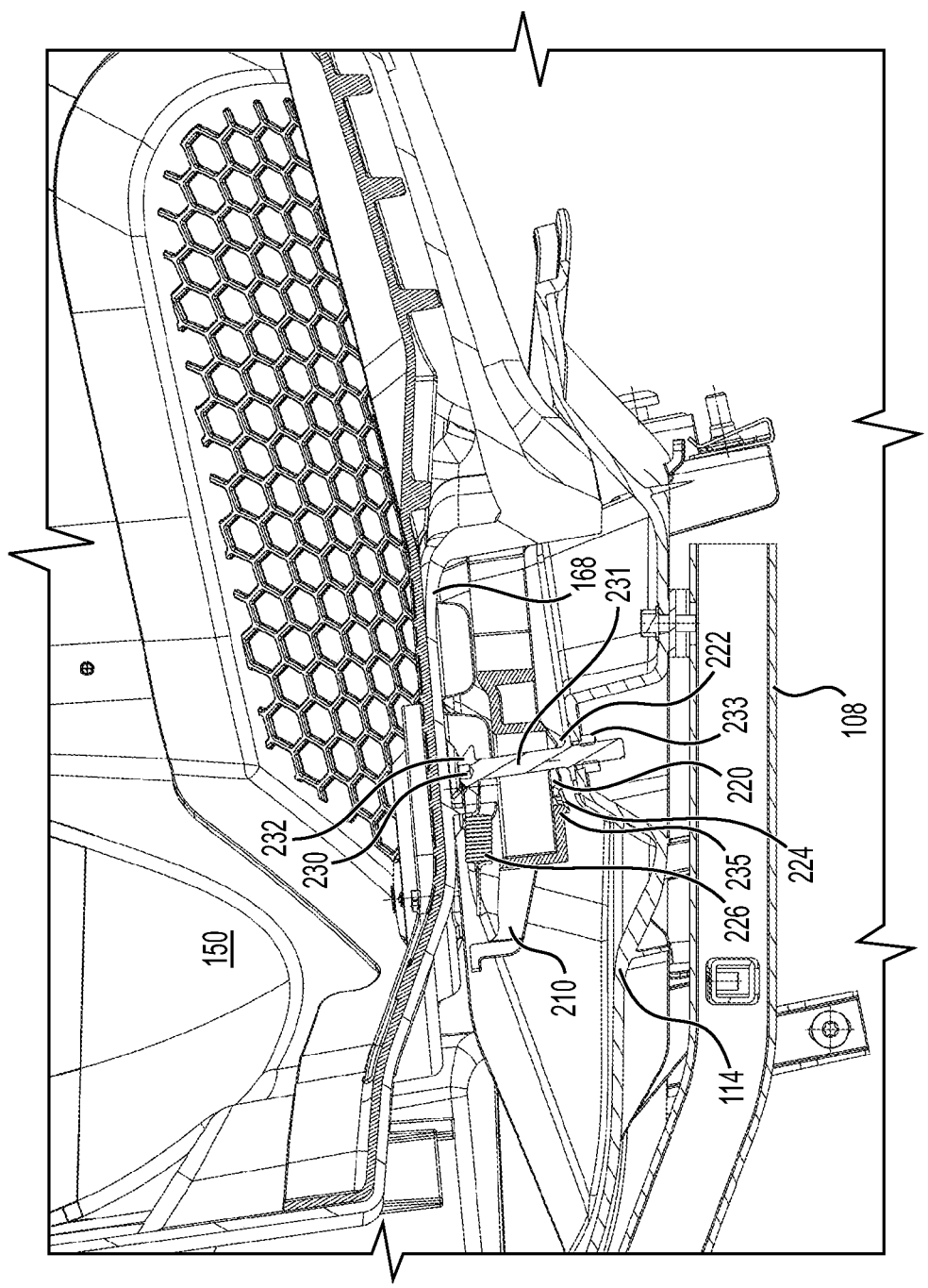
FIG. 15 is a cross-sectional view of part of the top storage container, the movable member and part of the frame when the movable member is in the unlatched position.

The movable member 210 is configured to interact with the posts 230 such that the movable member 210 is automatically moved from the latched position to the unlatched position as the storage container 150 is being positioned in place on the vehicle 100. More specifically, each post-receiving recess 220 is shaped such that when the storage container 150 is being positioned in place on the frame 108 of the vehicle 100 by pivoting the storage container 150 downward about the axis A1, the movable member 210 is forced into the unlatched position to accept the posts 230 therein. To that end, as shown in FIGS. 14 and 15, in this embodiment, the undersized portion 224 of each post-receiving recess 220 is bounded by a sloped surface 235 that surrounds the undersized portion 224. In this embodiment, the sloped surface 235 is formed by a rounded edge which defines the undersized portion 224 of the post-receiving recess 220. As will be described in greater detail below, when the sloped surface 235 encounters the head 232 of the corresponding post 230, the movable member 210 is pushed towards the unlatched position and such as to receive the post 230 into the oversized portion 230 of the post-receiving recess 220.

With reference to FIGS. 11 to 14, the passive attachment device 230 also includes two biasing elements 226 for biasing the movable member 210 toward the latched position. The biasing elements 226 are thus provided to ensure that the movable member 210 is naturally retained in the latched position so that removal of the storage container 150 from the vehicle 100 is restricted unless, as will be described further below, the user purposely intervenes to cause disengagement of the movable member 210 from the posts 230. In addition, the biasing elements 226 ensure that after the movable member 210 has been pushed towards the unlatched position by the heads 232 of the posts 230 and the heads 232 of the posts 230 have passed through the oversized portions 222 of the post-receiving recesses 220, the movable member 210 will return to the latched position. In this embodiment, the biasing elements 226 are springs which are connected between the movable member 210 and the storage container 150. It is contemplated that any other suitable type of biasing element may be used instead of a spring.

Figure 13:
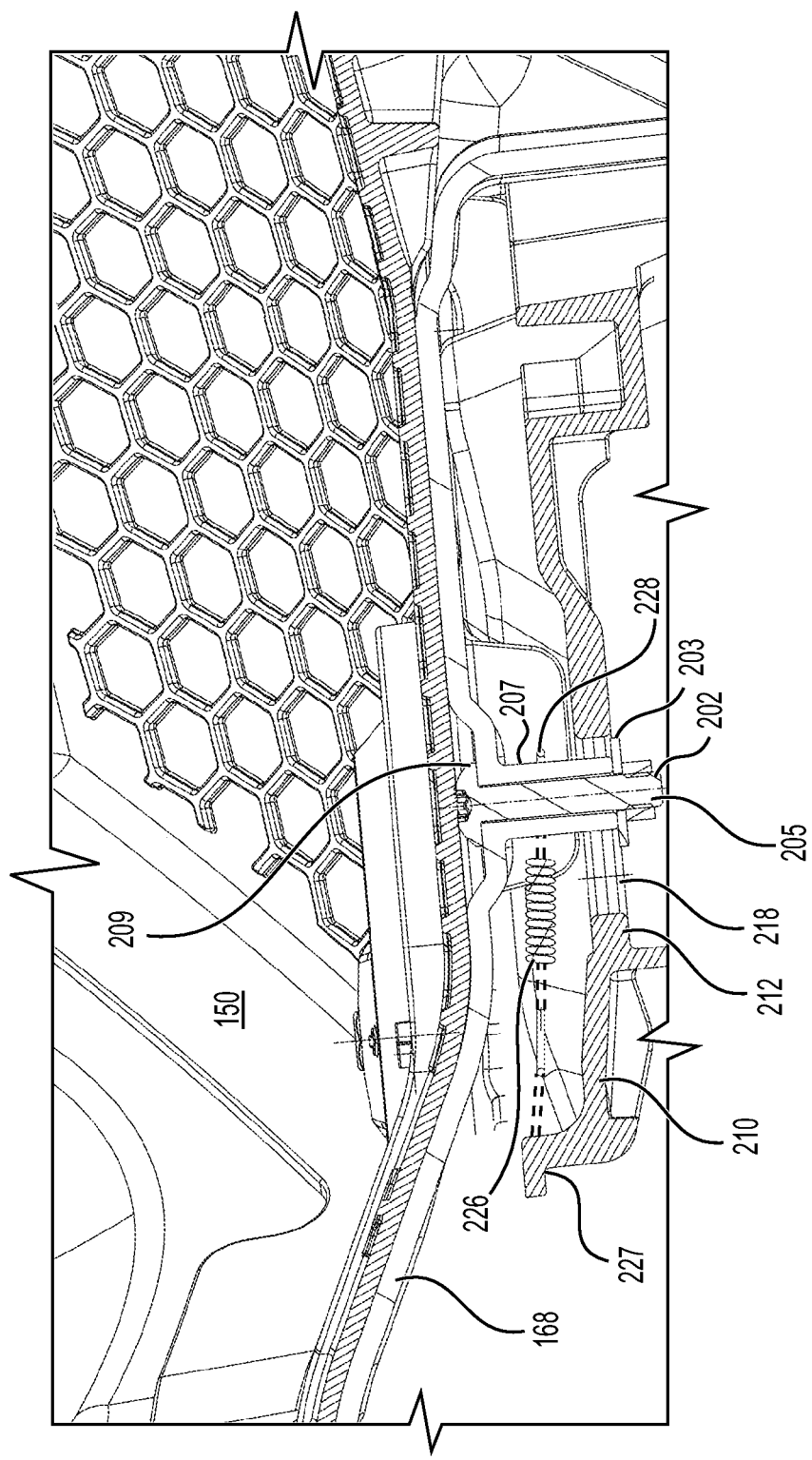
FIG. 13 is a cross-sectional view of part of the top storage container and the movable member taken along a guide slot of the movable member when the movable member is in an unlatched position.

As best seen in FIG. 13 which illustrates the movable member 210 in the unlatched position, for each spring 226, one end 227 thereof is connected to an end of a corresponding one of the arms 212 of the movable member 210 while the opposite end 228 thereof is connected to a one of the guide protrusions 207 that extend from the bottom wall 168 of the storage container 150. In this manner, the springs 226 apply a biasing force on the movable member 210 to bias the movable member 210 toward the latched position.

Thus, when the storage container 150 is installed onto the vehicle 100, the movable member 210 is in the latched position due to biasing force applied thereto by the springs 226. As such, as the storage container 150 is lowered onto the rear upper frame member 114, the heads 232 of the posts 230 abut the surfaces of the movable member 210 surrounding the undersized portions 224 of the post-receiving recesses 220. In particular, sloped surfaces of the heads 232 of the posts 230 (specifically, in this embodiment, a conical surface of the truncated conical shape of the head 232 of each post 230) abut the sloped surfaces 235 bounding the undersized portions 224 of the post-receiving recesses 220. Due to the angular disposition of the sloped surfaces 235, as well as the sloped surfaces of the heads 232, as the storage container 150 is forced downward, either by gravity (i.e., the load applied by the weight of the storage container 150) or by the user, the posts 230 apply a force on the movable member 210 having a component in an opposite direction of the biasing force of the springs 226. In particular, when the load applied on the storage container 150 is sufficiently strong, the force applied by the posts 230 on the sloped surfaces 235 overcomes the biasing force of the springs 226, thus causing the movable member 210 to slide forwardly relative to the storage container 150. The movable member 210 is thus moved from the latched position to the unlatched position, whereby the posts 230 are aligned with and enter the oversized portions 222 of the post-receiving recesses 220. When the force that is applied by the posts 230 on the sloped surfaces 235 has ceased (i.e. when the heads 232 of the posts 230 pass through the oversized portions 222 of the post-receiving recesses 220), the movable member 210 slides back into the latched position in response to the now unopposed biasing force of the springs 226. The movable member 210 is therefore latched onto the vehicle 100 and is not removable therefrom unless the user purposely intervenes to disengage the movable member 210 from the posts 230. Notably, in order to disengage the movable member 210 from the posts 230 when the movable member is in the latched position, the user pushes the movable member 210 forward via the handle 215 which displaces the movable member 210 into the unlatched position, thus allowing the posts 230 to exit the post-receiving recesses 220.

It is contemplated that the heads 232 of the posts 230 may have a shape other than a truncated conical shape in order to define a sloped surface thereof. For example, the head 232 of each post 230 may be dome-shaped to define the sloped surface thereof.

The active attachment device 250 will now be described with particular reference to FIGS. 8, 9 and 17 to 20. The active attachment device 250 is manually operable by the user to selectively lock the storage container 150 in place on the vehicle 100. Since, as described above, the passive attachment device 200 automatically engages the storage container 150 with the frame 108 of the vehicle 100 when the storage container 150 is positioned in place on the vehicle 100, the storage container 150 is locked in place on the vehicle by the active attachment device 250 once the storage container 150 is already secured to the vehicle 100 via the passive attachment device 200. However, the active attachment device 250 additionally prevents motion of the storage container 150 relative to the vehicle 100 when the active attachment device 250 is engaged so as to lock the storage container 150 tightly in place on the vehicle 100.

Figure 9:
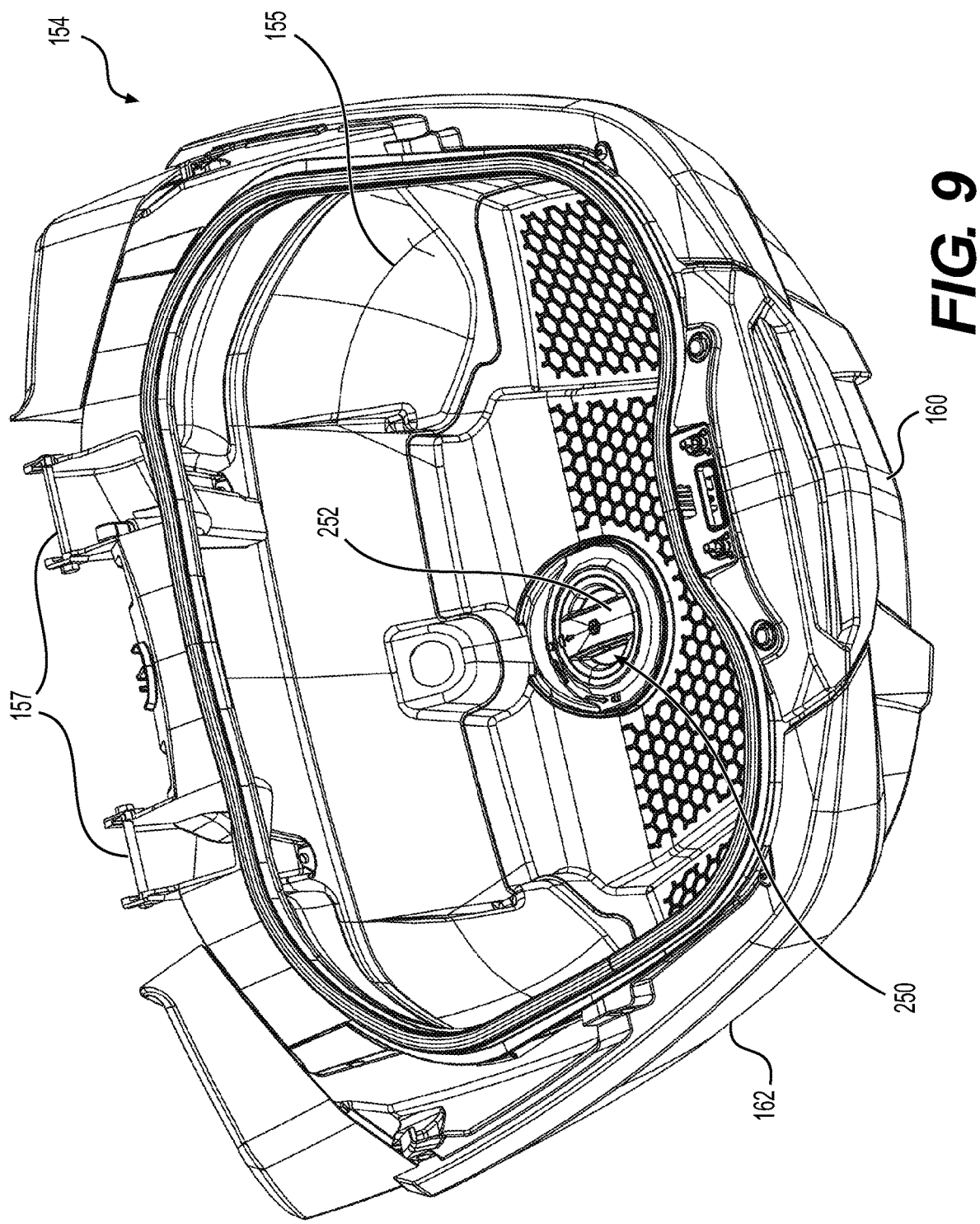
FIG. 9 is a perspective view, taken from a top, rear, left side, of a base portion of the top storage container of FIG. 7.
Figure 10:
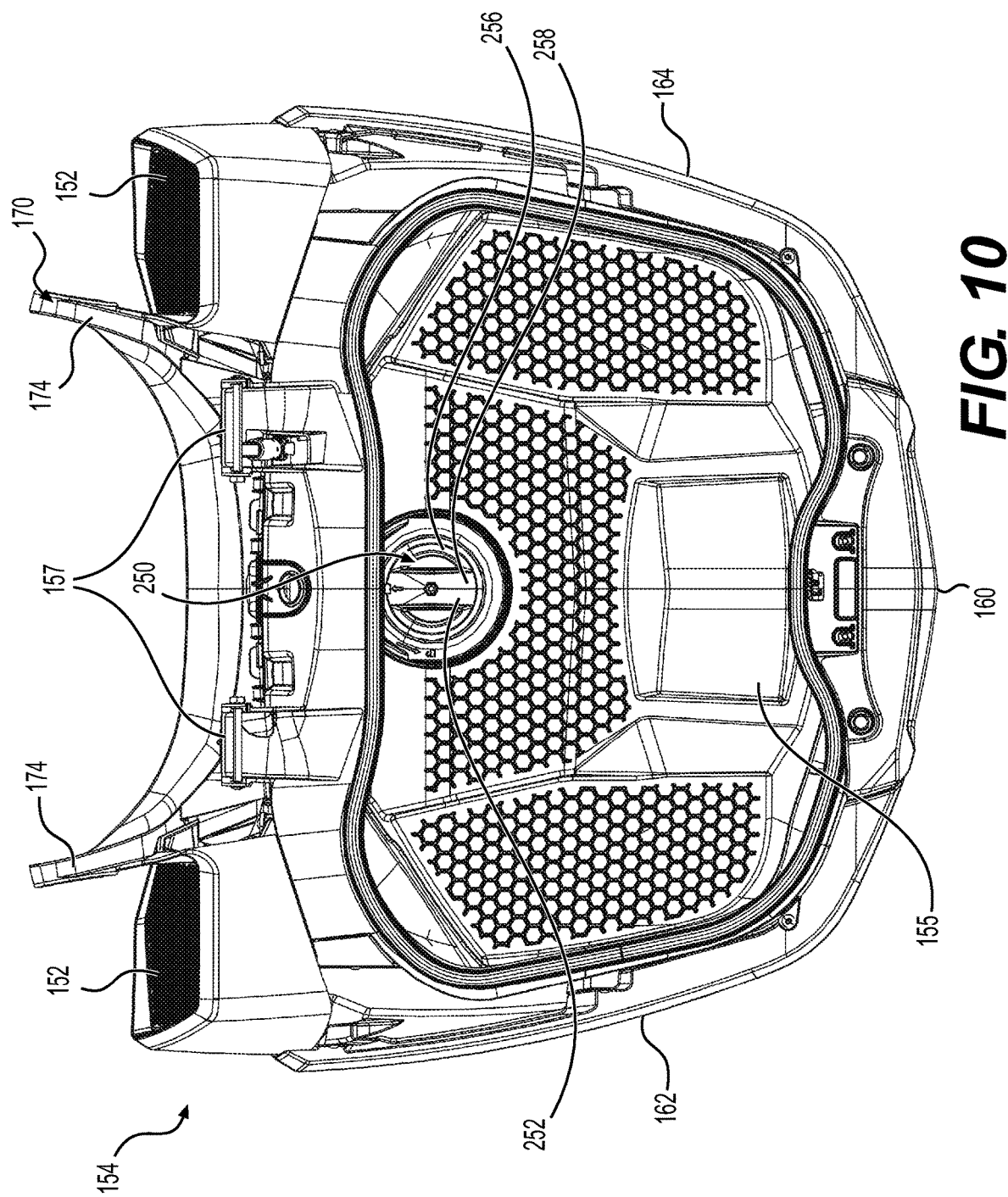
FIG. 10 is a top plan view of the base portion of FIG. 9.
Figure 17:
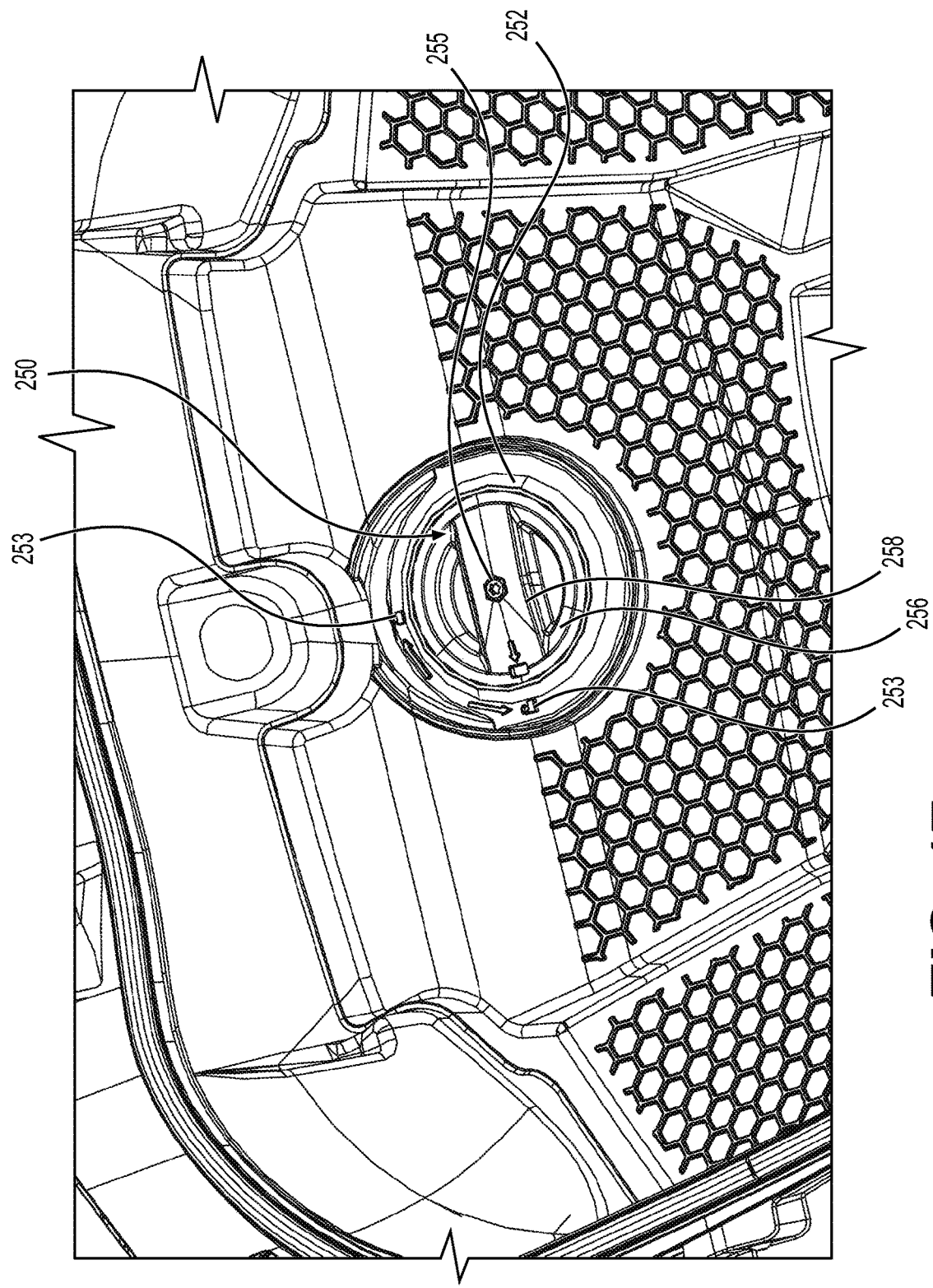
FIG. 17 is a perspective view, taken from a top, rear, left side, of a quick-connect actuator of the active attachment device, with the locking member in the unlocked position.
Figure 18:
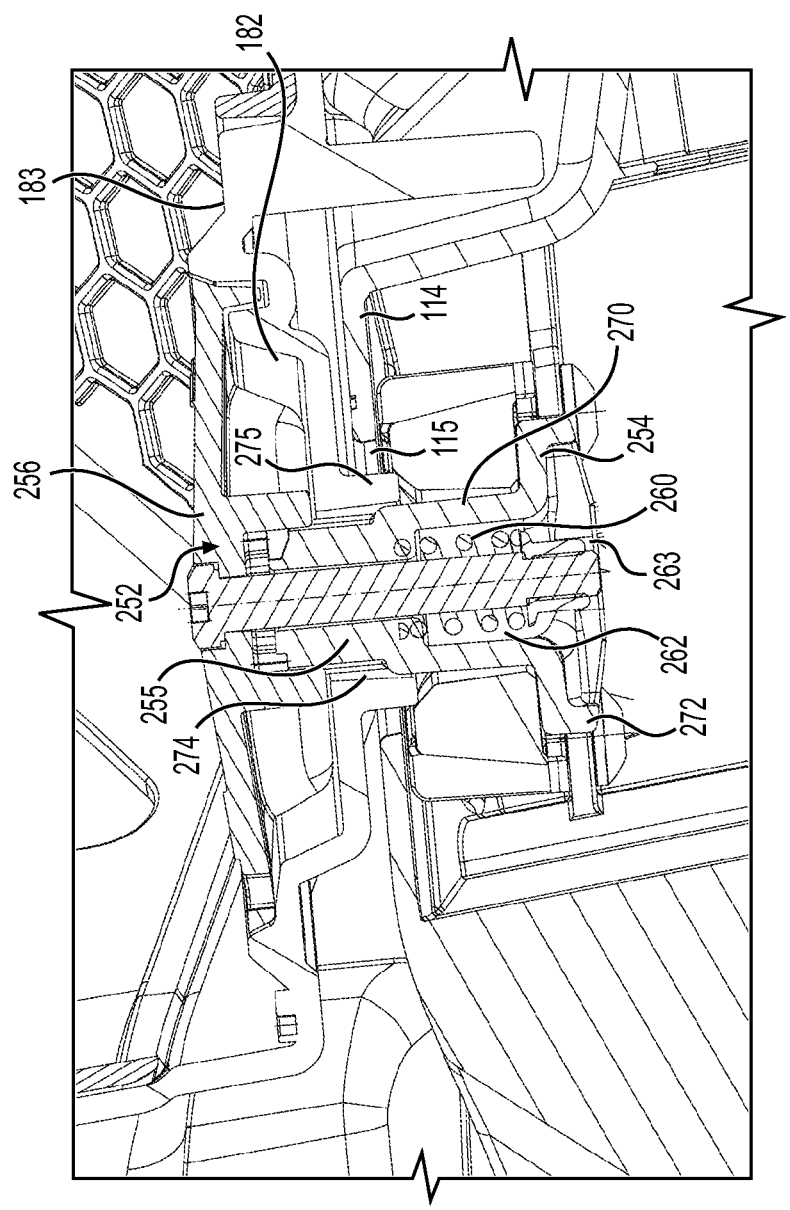
FIG. 18 is a cross-sectional view of the active attachment device, with the locking member shown in a locked position.

As shown in FIGS. 5, 6, 8 and 9, the active attachment device 250 is affixed to the bottom side of the storage container 150 and is configured to engage a lock opening 115 defined in the rear upper frame member 114. The active attachment device 250 has a quick-connect actuator 252 and a locking member 254 operatively connected to the quick-connect actuator 252. The quick-connect actuator 252 and the locking member 254 are mounted to the storage container 150. The quick-connect actuator 252 is configured to be handled by the user and is accessible via the interior space 155 of the storage container 150, as shown in FIGS. 9 and 10. As such, the active attachment device 250 cannot be unlocked when the lid portion 156 of the storage container 150 is locked to the base portion 154. More specifically, in this embodiment, the quick-connect actuator 252 has a circular body 256 and a lever 258 formed on the body 256. As shown in FIG. 18, the body 256 is inserted in a circular recess 182 defined in an inner bottom surface 183 of the storage container 150. The lever 258 is grasped by the user to operate the active attachment device 250. In particular, the lever 258 is handled by the user to rotate the quick-connect actuator 252 such as to lock or unlock the active attachment device 250, as will be described in more detail below. As shown in FIG. 17, inscriptions 253 are provided in the inner bottom surface 183 of the storage container 150 to indicate if the active attachment device 250 is locked and unlocked. An indicator 217 provided on the quick-connect actuator 252 is aligned with a given one of the inscriptions 253 to lock or unlock the active attachment device 250. In this embodiment, the quick-connect actuator 252 is rotated by a quarter-turn (i.e., 90°) to move the locking member 254 from the unlocked position to the locked position and vice-versa. In order to limit the rotation of the quick-connect actuator 252 to a quarter-turn, a structure (not shown) is formed on the inner bottom surface 183 of the storage container 150 which prevents the body 256 of the quick-connect from turning beyond the quarter-turn in each direction.

It is contemplated that the lever 258 may be substituted by any other suitable structure which can be handled by the user (e.g., a handle).

Figure 19:
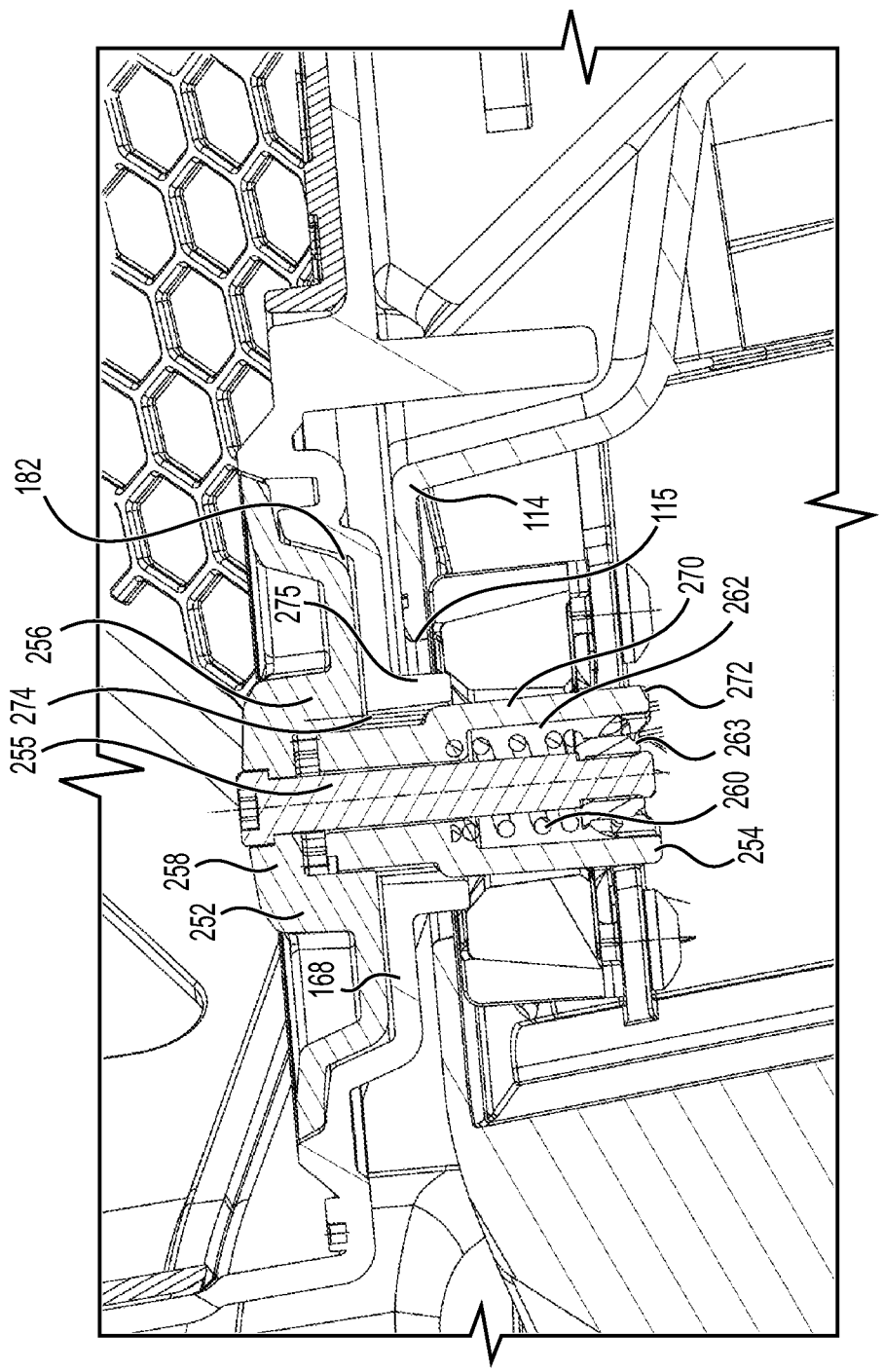
FIG. 19 is a cross-sectional view of the active attachment device, with the locking shown in the unlocked position.

As can be seen in FIGS. 18 and 19, the locking member 254 is provided on the opposite side of the bottom wall 168 from the quick-connect actuator 252 such that the locking member 254 protrudes from the bottom side of the storage container 150. The locking member 254 is connected to the quick-connect actuator 252 by a central fastener 255 that extends across the opposite sides of the bottom wall 168 of the storage container 150. A spring 260 is received in a central recess 262 defined by the locking member 254 and surrounds part of the fastener 255 extending in the central recess 262. A nut 263 is threadedly engaged to an end of the fastener 255 and compresses the spring 260 in the central recess 262.

Figure 16:
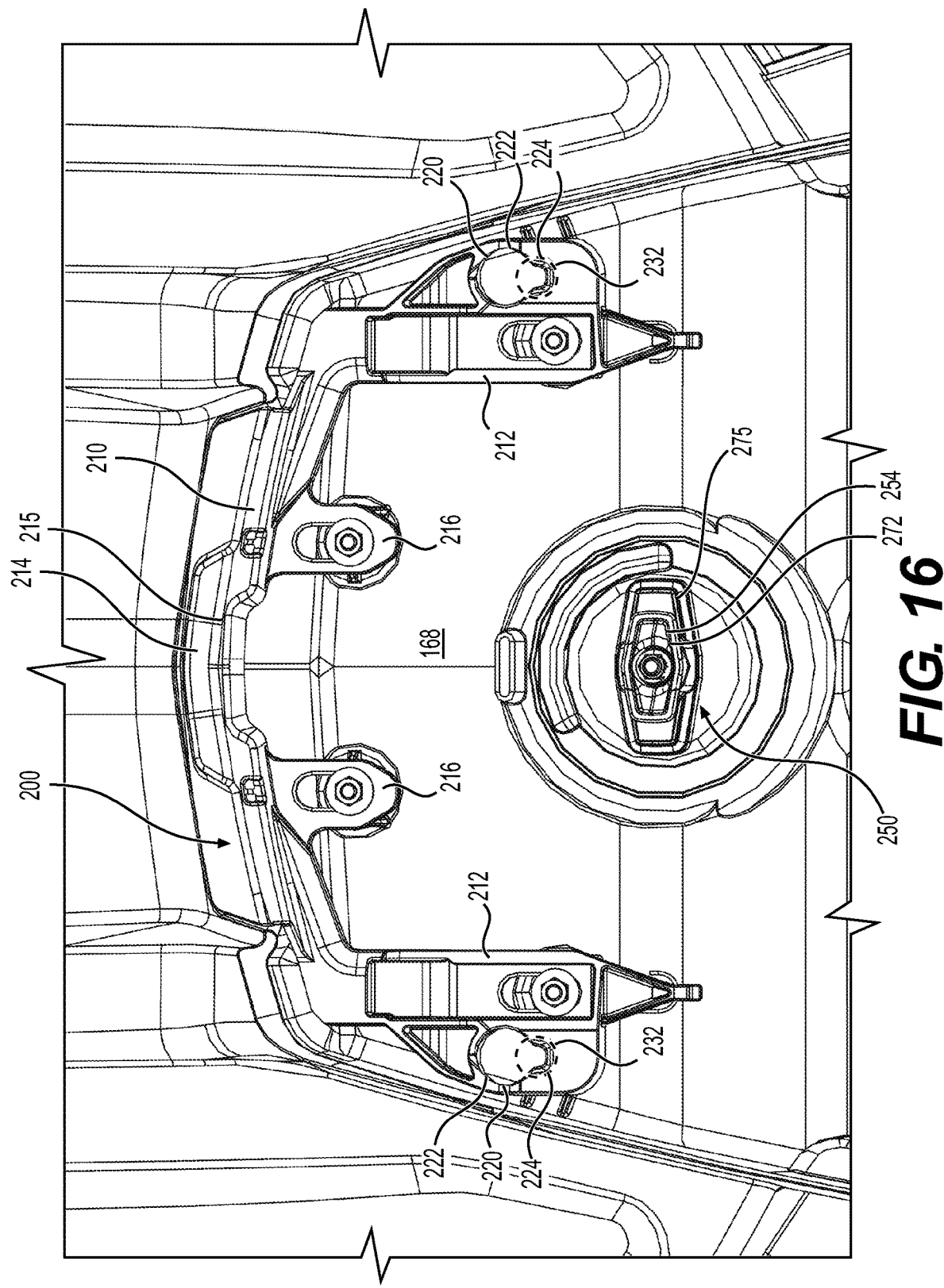
FIG. 16 is a bottom plan view of the top storage container of FIG. 7, with a locking member of an active attachment device connected thereto shown in an unlocked position.

As shown in FIG. 18, the locking member 254 has a hub portion 270 and an end portion 272. The hub portion 270 is inserted into an aperture 274 defined by a protruding base 275 formed by the bottom wall 168 of the storage container 150. As shown in FIG. 16, the end portion 272 has an elongated hexagonal shape. Similarly, the protruding base 275 has an elongated hexagonal shape. The end portion 272 thus has an elongated dimension measured along the elongated direction thereof. The dimension of the end portion 272 measured perpendicularly to the elongated direction thereof is thus smaller than the elongated dimension.

The locking member 254 is displaceable by the user, via the quick-connect actuator 252, between a locked position (shown in FIG. 18) and an unlocked position (shown in FIG. 19). More specifically, the locking member 254 is rotatable together with the quick-connect actuator 252 between the locked and unlocked positions.

Thus, in order to secure the storage container 150 to the vehicle 100 via the active attachment device 250, the locking member 254 is inserted into the lock opening 115 of the rear upper frame member 114. Specifically, the storage container 150 is placed on the rear upper frame member 114 to place the protruding base 275 and the end portion 272 of the locking member 254 into the lock opening 115. The lock opening 115 has an elongated hexagonal shape similar to that of the protruding base 275 and is dimensioned to receive the protruding base 275 therein. Once in position in the lock opening 115 of the rear upper frame member 114, when the locking member 254 is in the locked position, the locking member 254 is irremovable through the lock opening 115 as the elongated dimension of the end portion 272 of the locking member 254 is aligned with a section of the lock opening 115 that has a smaller dimension. The active attachment device 250 thus locks the storage compartment 250 in place on the vehicle 100. Moreover, in the locked position of the locking member 254, the end portion 272 has no appreciable vertical range of motion as the end portion 272 is prevented from moving vertically by a lower surface of the rear upper frame member 114. Therefore, in the locked position of the locking member 254, the storage container 150 does not have any appreciable range of motion and is locked in place on the vehicle 100. However, when the locking member 254 is in the unlocked position, the locking member 254 is removable from the lock opening 115 as the elongated dimension of the end portion 272 of the locking member 254 is aligned with a section of the lock opening 115 that has a greater dimension. The active attachment device 250 thus unlocks the storage compartment 150 from the vehicle 100.

Figure 20:
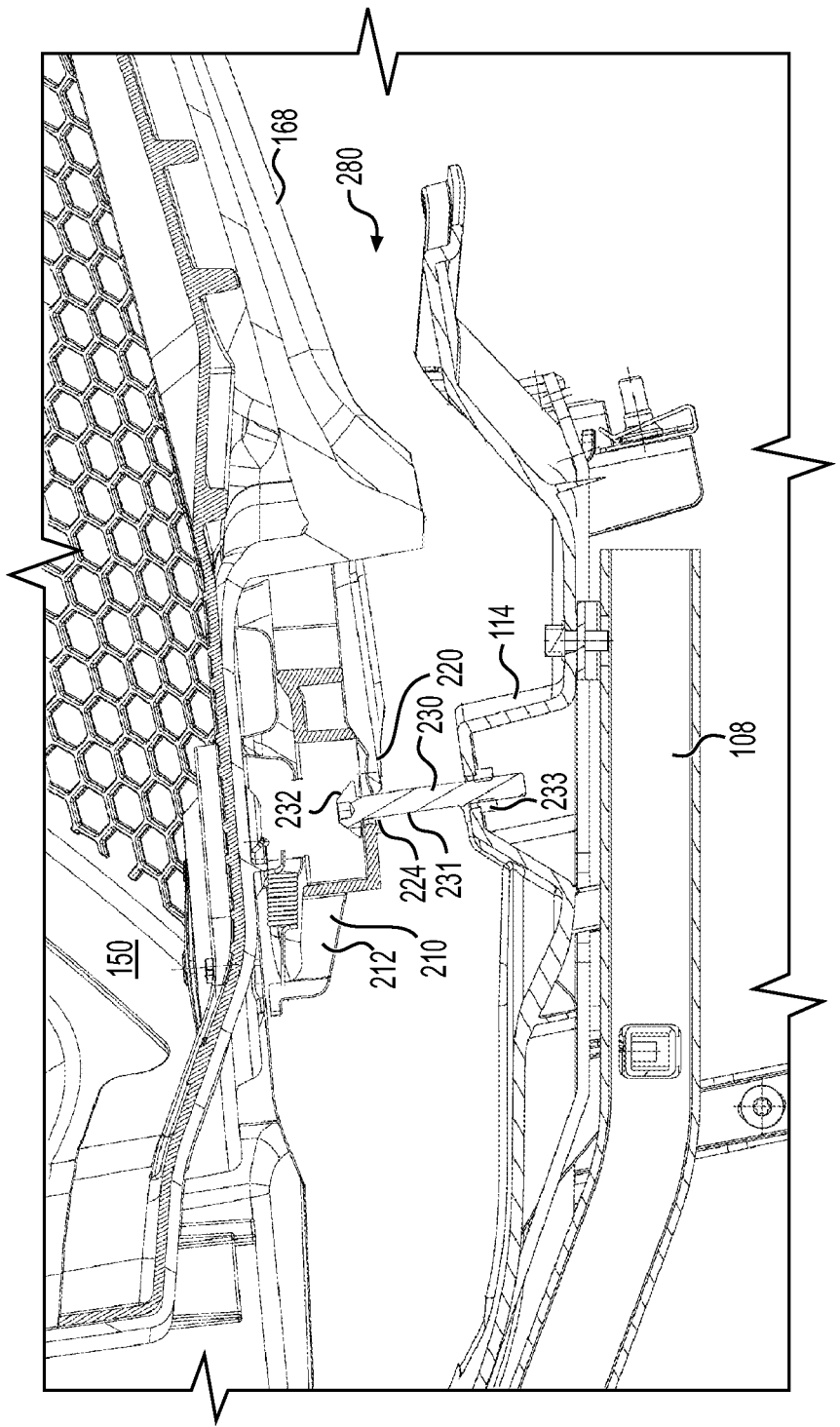
FIG. 20 is a cross-sectional view of part of the top storage container, the movable member, and part of the frame, with the movable member shown in the latched position and at a maximum range of motion thereof.

When the storage container 150 is secured to the vehicle 100 by the passive attachment device 200 and that the storage container 150 is unlocked from the vehicle 100 by the active attachment device 250, the storage container 150 has a limited range of motion relative to the frame 108 of the vehicle 100. More specifically, even when the active attachment device 250 is in the unlocked position and thus does not lock the storage container 150 in place, the passive attachment device 200 allows some pivoting of the storage container 150 about the axis A1 via the connector structures 170, 172. In particular, as shown in FIG. 20, in this embodiment, when the storage container 150 is secured to the vehicle 100 by the passive attachment device 200 and that the storage container 150 is unlocked from the vehicle 100 by the active attachment device 250, the storage container 150 has a vertical range of motion of about 20 mm before being stopped by engagement between the movable member 210 and the heads 232 of the posts 230. This limited range of motion thus allows a gap 280 (FIG. 20) to be formed between the bottom wall 168 of the storage container 150 and the rear upper frame member 114. The handle 215 of the movable member 210 is accessible via the gap 280 to allow the user to disengage the movable member 210 from the posts 230 in the manner described above.

Therefore, to attach the storage container 150 to the vehicle 100, the hook connector 170 is first engaged with the shaft assembly 172. The storage container 150 can then be pivoted about the axis A1. As the storage container 150 is lowered towards the rear upper frame member 114, the movable member 210 will engage the posts 230 thereby automatically latching the passive attachment device 200 and securing the storage container 150 to the vehicle 100 thereby. With the storage container 150 now in place, sitting atop the frame member 114, the locking member 254 (which is in the unlocked position) enters the lock opening 115 at the same time. The quick-connect actuator 252 is then actuated by the user to move the locking member 254 to the locked position, thereby further and completely securing the storage container 150 to the vehicle 100.

As will be understood by the reader, the passive attachment device 200 functions as a backup to the active attachment device 250. Notably, since the passive attachment device 200 is automatically engaged when the storage container 150 is disposed into its designated position on the vehicle 100 irrespective of whether the active attachment device 250 has been actuated or not by the user, the passive attachment device 200 retains the storage container 150 to the vehicle 100 even in scenarios where the active attachment device 250 has not been actuated by the user. Thus, for instance in a scenario where the active attachment device 250 should fail or the user forgets to lock the storage container 150 to the frame 108 of the vehicle 100 via the active attachment device 250, the passive attachment device 200 will still secure the storage container 150 to the vehicle 100 and prevent the storage container 150 from detaching from the vehicle 100.

Furthermore, the active attachment device 250 is operated by the user without using any tools (i.e., toollessly) which simplifies the process of locking or unlocking the active attachment device 250. Moreover, since the passive attachment device 200 engages the movable member 210 automatically when the storage container 150 is in place on the vehicle 100, the passive attachment device 200 also securely engages the storage container 150 with the frame 108 of the vehicle 100 without using any tools. Therefore, the overall attachment system including both attachment devices 200, 250 securely engages the storage container 150 to the vehicle 100 without requiring the use of any tools, while simultaneously providing a failsafe in case the active attachment device 250 should not be properly engaged.

It is contemplated that the storage container assembly including the storage container 150 and the passive and active attachment devices 200, 250 could be provided as an aftermarket accessory. While the posts 230 have been described as forming part of the passive attachment device 200, it is contemplated that, for instance in embodiments in which the storage container assembly is provided as a standalone product separate from the vehicle 100, the passive attachment device 200 of the storage container assembly includes only the movable member 210 connected to the storage container 150.

While the attachment system for the storage container 150 has been described herein in the context of the three-wheeled vehicle 100, it is contemplated that the attachment system could be user for a storage container for other types of vehicles. For example, a motorcycle may also benefit from such a storage container and attachment system. Marine vehicles (i.e., watercraft) may also be provided with such a storage container and attachment system.

Modifications and improvements to the above-described embodiment of the present technology may become apparent to those skilled in the art. The foregoing description is intended to be exemplary rather than limiting.

What is claimed is:

1. An attachment system for attaching a storage container to a vehicle, the attachment system comprising:
    a passive attachment device for securing the storage container to the vehicle, the passive attachment device automatically securing the storage container to the vehicle when the storage container is positioned in place on the vehicle, the passive attachment device comprising a movable member configured to be movably connected to a bottom side of the storage container, the movable member being movable relative to the storage container between a latched position and an unlatched position, wherein:
        in the latched position, the movable member restricts removal of the storage container from the vehicle, and
        in the unlatched position, the movable member is free of engagement with the vehicle so that the storage container is removable from the vehicle; and
    an active attachment device being manually operable by a user to selectively lock the storage container in place on the vehicle when the storage container is secured to the vehicle via the passive attachment device, the active attachment device preventing motion of the storage container relative to the vehicle when the active attachment device is engaged so as to lock the storage container in place on the vehicle.

2. The attachment system of claim 1, wherein, when the storage container is secured to the vehicle by the passive attachment device and that the storage container is unlocked from the vehicle by the active attachment device, the storage container has a limited range of motion relative to a frame of the vehicle.

3. The attachment system of claim 1, wherein:
    the passive attachment device further comprises at least one post configured to be connected to the vehicle;
    the movable member defines at least one post-receiving recess, each of the at least one post-receiving recess being configured to receive therein a respective one of the at least one post;
    each of the at least one post-receiving recess has a first dimension at a first portion thereof and a second dimension at a second portion thereof;
    in the latched position of the movable member, each of the at least one post being disposed in the first portion of a respective one of the at least one post-receiving recess;
    in the unlatched position of the movable member, each of the at least one post being disposed in the second portion of the respective one of the at least one post-receiving recess;
    the at least one post-receiving recess being sized such that:
        when the at least one post is in the first portion of the at least one post-receiving recess, the at least one post cannot be disengaged from the at least one post-receiving recess; and
        when the at least one post is in the second portion of the at least one post-receiving recess, the at least one post is disengageable from the at least one post-receiving recess.

4. The attachment system of claim 3, wherein the movable member is configured to be slidably connected to the bottom side of the storage container.

5. The attachment system of claim 3, wherein the passive attachment device further comprises:
    a biasing element configured to be mounted between the storage container and the movable member to bias the movable member toward the latched position.

6. The attachment system of claim 3, wherein the movable member is automatically moved from the latched position to the unlatched position as the storage container is being positioned in place on the vehicle.

7. The attachment system of claim 3, wherein:
    when the storage container is being positioned in place on the vehicle, the at least one post interacts with the movable member to cause the movable member to move from the latched position to the unlatched position so as to receive the at least one post in the at least one post-receiving recess.

8. The attachment system of claim 3, wherein the movable member forms a handle for the user to move the movable member from the latched position to the unlatched position in order to remove the storage container from the vehicle.

9. The attachment system of claim 8, wherein:
    when the storage container is secured to the vehicle by the passive attachment device and that the storage container is unlocked from the vehicle by the active attachment device, the storage container has a limited range of motion relative to a frame of the vehicle; and
    the handle of the movable member is accessible via a gap formed between the storage container and the frame of the vehicle when the storage container has the limited range of motion.

10. The attachment system of claim 3, wherein:
    the movable member is configured to be connected to the storage container by a plurality of fasteners; and
    the movable member defines a plurality of guide slots for receiving respective ones of the fasteners therein for slidably connecting the movable member to the storage container, the fasteners being movable along the guide slots.

11. The attachment system of claim 1, wherein the active attachment device comprises:
    a quick-connect actuator configured to be handled by the user; and
    a locking member operatively connected to the quick-connect actuator, the locking member being configured to be inserted into a lock opening defined by the vehicle,
    wherein:
        the quick-connect actuator and the locking member are configured to be mounted to the storage container;

the locking member is displaceable by the user between a locked position and an unlocked position via the quick-connect actuator;

in the locked position of the locking member, the locking member is irremovable through the lock opening defined by the vehicle such that the active attachment device locks the storage container in place on the vehicle; and in the unlocked position of the locking member, the locking member is removable through the lock opening defined in by the vehicle such that the active attachment device unlocks the storage container from the vehicle.

12. The attachment system of claim 11, wherein the locking member is rotatable between the locked position and the unlocked position.

13. The attachment system of claim 11, wherein, when the passive attachment device secures the storage container to the vehicle and the locking member is displaced to the unlocked position, the storage container remains secured to the vehicle via the passive attachment device.

14. The attachment system of claim 11, wherein:
the locking member of the active attachment device is configured to protrude from a bottom side of the storage container and be inserted into the opening defined by the vehicle; and
the quick-connect actuator is configured be accessible via an interior space defined by the storage container.

15. The attachment system of claim 1, further comprising:
a first connection structure configured to be connected to the vehicle; and
a second connection structure configured to be connected to the storage container, the second connection structure being engaged with and supported by the first connection structure when the storage container is positioned in place on the vehicle,
the first and second connection structures being shaped complementarily so as to prevent the second connection structure from being lifted upwardly when the second connection structure is engaged with the first connection structure.

16. The attachment system of claim 15, wherein:
the first connection structure is one of a shaft assembly and a hook connector; and
the second connection structure is an other one of the shaft assembly and the hook connector.

17. The attachment system of claim 15, wherein the second connection structure is pivotable about an axis defined by the first connection structure.

18. A vehicle, comprising:
a frame;
at least one front ground-engaging member operatively connected to the frame;
at least one rear ground-engaging member operatively connected to the frame;
a seat supported by the frame;
a storage container supported by and secured to the frame;
a passive attachment device securing the storage container to the frame, the passive attachment device automatically securing the storage container to the frame when the storage container is positioned in place, the passive attachment device comprising a movable member movably connected to a bottom side of the storage container, the movable member being movable relative to the storage container between a latched position and an unlatched position, wherein:
in the latched position, the movable member restricts removal of the storage container from a remainder of the vehicle, and
in the unlatched position, the movable member is free of engagement with the vehicle so that the storage container is removable from the remainder of the vehicle; and
an active attachment device being manually operable by a user to selectively lock the storage container in place when the storage container is secured to the frame via the passive attachment device, the active attachment device preventing motion of the storage container relative to the frame when the active attachment device is engaged so as to lock the storage container in place.

19. The vehicle of claim 18, wherein the storage container has a lid enclosing at least in part an interior space of the storage container, at least part of the active attachment device being accessible from the interior space of the storage container.

20. A storage container assembly for a vehicle, comprising:
a storage container defining an interior space, the storage container having a bottom side;
a passive attachment device for securing the storage container to the vehicle, the passive attachment device being connected to the bottom side of the storage container, the passive attachment device automatically securing the storage container to the vehicle when the storage container is positioned in place on the vehicle, the passive attachment device comprising a movable member movably connected to the bottom side of the storage container, the movable member being movable relative to the storage container between a latched position and an unlatched position, wherein:
in the latched position, the movable member restricts removal of the storage container from the vehicle, and
in the unlatched position, the movable member is free of engagement with the vehicle so that the storage container is removable from the vehicle; and
an active attachment device being manually operable by a user to selectively lock the storage container in place on the vehicle when the storage container is secured to the vehicle via the passive attachment device, the active attachment device preventing motion of the storage container relative to the vehicle when the active attachment device is engaged so as to lock the storage container in place on the vehicle.

* * * * *